(12) United States Patent
Dumons

(10) Patent No.: US 12,723,200 B2
(45) Date of Patent: Sep. 1, 2026

(54) METHOD AND DEVICE FOR PRODUCING ENERGY PRODUCTS BY CATALYTICALLY CRACKING A SOLID HYDROCARBON MATERIAL WITHOUT COKE FORMATION

(71) Applicant: D.M.S, Toulouse (FR)

(72) Inventor: Pierre Dumons, Toulouse (FR)

(73) Assignee: D.M.S, Toulouse (FR)

( * ) Notice: Subject to any disclaimer, the term of this patent is extended or adjusted under 35 U.S.C. 154(b) by 204 days.

(21) Appl. No.: 18/682,086

(22) PCT Filed: Aug. 12, 2022

(86) PCT No.: PCT/EP2022/072668

§ 371 (c)(1),
(2) Date: Feb. 7, 2024

(87) PCT Pub. No.: WO2023/017150

PCT Pub. Date: Feb. 16, 2023

(65) Prior Publication Data

US 2024/0343979 A1 Oct. 17, 2024

(51) Int. Cl.

*C10G 1/08* (2006.01)
*C01B 3/02* (2026.01)
*C01B 32/50* (2017.01)

(52) U.S. Cl.

CPC .................. *C10G 1/08* (2013.01); *C01B 3/02* (2013.01); *C01B 32/50* (2017.08); *C10G 2300/1003* (2013.01); *C10G 2400/20* (2013.01)

(58) Field of Classification Search

CPC .............. C10G 1/08; C10G 2300/1003; C10G 2400/20; C10G 1/083; C10G 1/10; C01B 3/02; C01B 32/50

See application file for complete search history.

(56) References Cited

U.S. PATENT DOCUMENTS

2012/0241359 A1* 9/2012 Al-Thubaiti ........... B01D 3/009 422/187
2013/0276360 A1* 10/2013 Boon ..................... C10G 1/065 44/307
2014/0121428 A1* 5/2014 Wang ..................... C10G 11/00 585/310

(Continued)

FOREIGN PATENT DOCUMENTS

| | | |
|---|---|---|
| DE | 10 2010 060675 | 5/2012 |
| WO | 2018127438 | 7/2018 |
| WO | 2020/182337 | 9/2020 |

OTHER PUBLICATIONS

International Search Report dated Nov. 16, 2022.

*Primary Examiner* — Ellen M Mcavoy
(74) *Attorney, Agent, or Firm* — IPSILON USA, LLP

(57) ABSTRACT

A method includes maintaining a gas atmosphere at the cracking pressure through gas-exchange communication between the gas atmosphere of a cracking reactor and the gas atmosphere of a device, referred to as a thermochemical vacuum pump. A change of state of the condensation oil from the expanded gas state to the condensed liquid state is brought about in the thermochemical vacuum pump in a gas-exchange communication with the gas atmosphere of the cracking reactor, and the condensation oil is chosen so that its state-change temperature is at the level of the cracking temperature at the cracking pressure.

16 Claims, 3 Drawing Sheets

(56) References Cited

U.S. PATENT DOCUMENTS

2019/0330537 A1* 10/2019 Dumons .................. B01J 8/085
2023/0145975 A1* 5/2023 Subramaniyam ..... C10B 57/045
585/241

* cited by examiner 152
145
131
115
11
154
151
140
11
146
10
150
130
149
148
140
185
113
158
140
184
139
14
10
14
140
12
147
9
178
137
153
120
133
127
141
136
126
144
128
2
138
143
100
2
142
134
135
138
2
132
125

METHOD AND DEVICE FOR PRODUCING ENERGY PRODUCTS BY CATALYTICALLY CRACKING A SOLID HYDROCARBON MATERIAL WITHOUT COKE FORMATION

RELATED APPLICATION

This application is a National Phase of PCT/EP2022/072668 filed on Aug. 12, 2022, which claims the benefit of priority from French Patent Application No. 21 08691 filed on Aug. 13, 2021, the entirety of which are incorporated by reference.

Field of Invention

The invention concerns a method and a device for producing energy products by catalytically cracking at low temperature a solid material—in particular waste—in the fragmented state and including at least one hydrocarbon compound, without formation of coke, dioxins and/or furans.

Description of Relataed Art

A method of this kind and a device of this kind are adapted to be able to enable the production of energy products such as:

- carbon dioxide ($CO_2$) usable for the synthesis of alkanes, and/or
- dihydrogen ($H_2$) gas classed as "green" dihydrogen ($H_2$) when it is obtained from the decomposition of renewable biomass and/or waste, and/or
- unsaturated hydrocarbons—in particular hydrocarbons with recycled linear carbon chains such as alkenes, adapted to be used in the production of synthetic polymers (PE, PVC, PP, PET, PMMA, for example), but also able to react with dihydrogen ($H_2$) gas and to form energy products such as fuels, and/or
- energy products such as short-chain saturated hydrocarbons (alkanes), known as "diesel" or "gas oil", "gasoline" or "kerosene"—containing a number of carbon atoms between 1 ($CH_4$) and 18 ($C_{18}H_{38}$)—usable as fuel for a petrol engine or a diesel engine or a turbojet or a turbocompressor.

Thus the invention concerns in particular a method of this kind and a device of this kind enabling transformation of a solid material containing at least one hydrocarbon compound—in particular a material of this kind considered as waste—and to valorize it in the form of valorization products, of greater added value, in particular in the form of energy products such as fuels, dihydrogen and/or carbon dioxide and/or unsaturated hydrocarbons. A material of this kind and waste of this kind may contain biomass, derivatives of petroleum and/or waste therefrom, such as synthetic polymer materials otherwise known as "plastic" materials. A material of this kind and waste of this kind may contain a non-inert fraction of domestic waste. A material of this kind and waste of this kind may in particular result from an operation of selective sorting of domestic waste.

Throughout the text:

- the term "cracking" designates the thermal reaction of conversion of a hydrocarbon compound into hydrocarbons of lower molecular weight than the hydrocarbon compound, implying rupture of covalent interatomic bonds;
- the expression "hydrocarbon material" designates a material including at least one hydrocarbon compound, that is to say at least one compound formed mostly of atoms of carbon and atoms of hydrogen. This may be a material formed exclusively of hydrocarbon compounds. It may also be a material including at least one hydrocarbon compound and at least one compound free of carbon and hydrogen. A hydrocarbon material of this kind may include at least one hydrocarbon compound including at least one heteroatom such as, for example, oxygen (O), nitrogen (N), phosphorous (P), sulfur(S), at least one halogen (CE, Br, F, I), etc. A "hydrocarbon material" of this kind may be a material including biomass. A hydrocarbon compound of this kind may include biomass and/or derivatives of petroleum and/or waste therefrom;
- the term "waste" designates an unused part of a material that may be the subject of appropriate reprocessing in order to eliminate it or to store it. It may for example be industrial waste, agricultural waste-such as non-valorized parts of plants—or domestic waste.

DE10210060675 describes a method and a device for catalytic cracking in vacuo of a material containing hydrocarbons at a temperature between 250° and 360° C. inclusive. In DE10210060675 the vacuum is produced by means of a vacuum pump. Problems arise in maintaining under a controlled vacuum the atmosphere of a cracking reactor in which compounds in the gas state are produced continuously. It is technically complex and necessarily not economically viable.

The invention aims to alleviate this disadvantage.

The invention therefore aims to propose a method and a device for catalytic cracking at low temperature and at reduced pressure that enables facilitated control of said reduced pressure during catalytic cracking.

There is also known from WO2018/127438 a method and a device for producing fuel by the catalytic cracking of a solid hydrocarbon material without formation of coke, dioxins and/or furans. WO2018/127438 describes heating a dispersion of a solid material in the fragmented state including at least one hydrocarbon compound, a cracking catalyst and an alkaline compound, in an oil that is inert with respect to cracking, at a temperature above the cracking temperature of at least one hydrocarbon compound of the solid material but lower than the temperature of formation of an undesirable carbon biproduct, coke, liable to be formed in contact with a metal wall of a conduction type heating device, in particular a metal wall including iron or nickel and heated to a temperature greater than or equal to 400° C., or contact with a metal wall heated to a temperature greater than or equal to 360° C. when coke is already formed on the metal wall, the formation of coke in contact with the metal wall of the conduction type heating device reducing thermal conduction and rapidly rendering the heating device inoperative.

To prevent heating the cracking dispersion by bringing the cracking dispersion into contact with the metal wall of a conduction type heating device necessarily heated to a temperature greater than 400° C. or 360° C. for the cracking dispersion to reach the cracking temperature, WO2018/127438 proposes heating the cracking dispersion by mixing a prepared quantity of this cracking dispersion at a temperature below the cracking temperature of each hydrocarbon compound and below the coke formation temperature with a quantity of inert oil substantially free of solid material in the fragmented state and of catalyst, the inert liquid being heated to a temperature greater than the cracking temperature so that the mixture formed reaches a temperature at least equal to the cracking temperature and below the coke formation temperature.

The coke formation problem is solved by the method from WO2018/127438.

This being the case, industrial solutions are looked for to improve the efficiency of the cracking reaction and to obtain significant quantities of renewable valorization products. In particular, solutions are looked for to enable transformation of solid materials including hydrocarbon compounds or waste therefrom into such valorization products, in particular carbon dioxide, energy products and/or dihydrogen, by a low-temperature thermochemical path, without formation of coke, dioxins and/or furans. Solutions of this kind are looked for in order to obtain valorization products of this kind where the production cost is comparable to the production cost of equivalent products from fossil sources and the production of which enables a massive reduction in emission of greenhouse gases, in particular by the suppression of such emission by known waste treatments.

Objects and Summary

Thus the invention aims to propose a method and a device for producing valorization products by the catalytic cracking at low temperature of a solid material including at least one hydrocarbon compound that are sufficiently simple and reliable in their implementation and in their use to enable operation on an industrial scale.

The invention aims in particular to propose a method of this kind and a device of this kind that enable the formation of coke, dioxins and/or furans to be prevented.

The invention aims in particular to propose a method of this kind and a device of this kind that can be at least partially automated.

The invention therefore aims to propose a method of this kind and a device of this kind enabling production of valorization products with an efficiency that it compatible with production on an industrial scale.

The invention also aims to propose a method of this kind and a device of this kind in which the necessary input of energy is optimized and in which the overall energy balance of the production of these valorization products—in particular of carbon dioxide, unsaturated hydrocarbons, energy products such as fuels and/or dihydrogen—is optimized.

The invention also aims to propose a method of this kind and a device of this kind enabling virtually complete transformation of a solid material such as waste including at least one hydrocarbon compound, in particular a solid material including biomass and/or derivatives of petroleum and/or waste, such as derivatives of petroleum, into valorization products such as result from the decomposition by the catalytic cracking at low temperature of the solid material in the fragmented state, decomposition by the catalytic cracking being immediately followed by recomposition of the decomposition products into alkenes and, because of the decomposition of the biomass, dihydrogen ($H_2$) and/or carbon dioxide ($CO_2$) and the hydrogenation of the alkenes into constituent alkanes of fuels. The invention aims in particular to propose a method of this kind and a device of this kind enabling production of carbon dioxide ($CO_2$) that can be used as a reagent in a synthesis of fuel alkanes the manufacturing cost of which is economically acceptable. The invention aims in particular to propose a method this kind and a device of this kind that are alternatives to extraction of atmospheric carbon dioxide.

The invention also aims to propose a method this kind and a device of this kind enabling continuous production of such valorization products, that is to say with no load breaks and in a short time period.

To this end the invention concerns a method for producing at least one valorization product, in particular at least one valorization product, chosen in the group formed of energy products such as fuels (alkanes), alkene(s), dihydrogen ($H_2$) gas and carbon dioxide ($CO_2$), by catalytically cracking at a low temperature a fragmented solid material—in particular waste-without the formation of coke, dioxins and/or furans, in which a flow of a so-called cracking dispersion composition comprising:

- a first oil, referred to a cracking oil, which is inert against the catalytic cracking, that is to say an oil chosen so as not to be structurally modified chemically during catalytic cracking and to be maintained in the liquid state during catalytic cracking,
- a fragmented solid material including at least one hydrocarbon compound, in particular biomass and/or derivatives of petroleum and/or waste therefrom,
- at least one catalytic cracking catalyst, in particular a solid catalyst in the divided state, and
- at least one alkaline compound, is brought to a temperature, referred to as the cracking temperature, of between 250° C. and 300° C. inclusive, preferably between 260° C. and 280° C. inclusive, chosen so as to enable at least one gas valorization product, in particular at least one energy product, to be produced by catalytically cracking at least one hydrocarbon compound of the fragmented solid material in said cracking dispersion, in which the flow of said cracking dispersion at said cracking temperature is placed in a gas tight cracking reactor and in contact with a gas atmosphere at a so-called cracking pressure that is below atmospheric pressure.

A method of this kind in accordance with the invention transforms by the catalytic cracking at low temperature at least one hydrocarbon compound of a solid material in the fragmented state into a valorization product having a molecular weight less than the molecular weight of the hydrocarbon compound. In particular, a hydrocarbon compound of this kind is transformed into a valorization product, in particular chosen in the group formed of alkanes and alkenes, dihydrogen ($H_2$) gas and carbon dioxide ($CO_2$), without formation of coke, dioxins and/or furans, when said cracking temperature is below the temperature of formation of coke, dioxins and/or furans.

Cracking said solid material in the fragmented state—in particular of said solid material in the fragmented state including biomass and/or polymer compounds derived from petroleum and/or waste from such polymer compounds—is instantaneously accompanied by a recomposition of alkenes and, from the decomposition of biomass, carbon dioxide and dihydrogen followed by hydrogenation of alkenes into alkanes forming fuels, without formation of coke, dioxins and/or furans.

Depending on the choice of starting material—waste—and its composition in terms of hydrocarbon compounds, at least one hydrocarbon compound is transformed into valorization products such as unsaturated hydrocarbons and dihydrogen ($H_2$) gas. In particular, by the catalytic cracking of a material including biomass, dihydrogen ($H_2$) is formed, as well as, where applicable, carbon dioxide ($CO_2$). Then, depending on the choice and the composition of the starting material, it is possible to orient the catalytic cracking toward a final production predominantly of dihydrogen ($H_2$) gas and carbon dioxide for hydrogenation of unsaturated hydrocarbons or alkenes into saturated hydrocarbons constituting fuels.

The inventor has observed that the catalytic cracking reaction occurs after initiation of the reaction, at least for some—in particular for most—in a ternary solid/liquid/cracking gas foam in expansion formed, because of the initiation of cracking, at the interface extending between said cracking dispersion and the gas atmosphere above said cracking dispersion. It has been determined that it is advantageous to maintain this gas atmosphere at a reduced pressure to encourage catalytic cracking, in particular without formation of coke, dioxins and/or furans. This ternary foam formed during cracking consists of solids, such as the solid material in the fragmented state, catalysts, alkaline compounds and liquids essentially in the form of said cracking oil and a gas composition formed because of the catalytic cracking and including in particular short-chain hydrocarbons, carbon dioxide ($CO_2$), water vapor, dihydrogen ($H_2$) gas. Catalytic cracking of this kind is obtained in a gas atmosphere at reduced pressure, known as the cracking pressure, reducing the quantity of energy necessary for the fragmentation and the dissociation of the hydrocarbon compounds into valorization products in the gas state in the presence of a cracking catalyst and to achieve this cracking at a cracking temperature below said cracking temperature of the same hydrocarbon compounds at atmospheric pressure. Catalytic cracking of this kind is therefore obtained at reduced pressure and at a temperature below the temperature of formation of coke, dioxins and/or furans.

Furthermore, said cracking pressure below atmospheric pressure to which said cracking dispersion itself is subjected before it is at least in part degassed deoxygenated enables limitation of the oxygen partial pressure in the gas atmosphere above said cracking dispersion and enables limitation or even complete suppression of uncontrolled exothermic combustion of dihydrogen ($H_2$) gas formed because of the catalytic cracking, subsequent production of water vapor because of this combustion and uncontrolled heating of said cracking dispersion because of this uncontrolled exothermic combustion of dihydrogen ($H_2$) gas.

In accordance with the invention said cracking oil is chosen so that its evaporation temperature is very much higher than said cracking temperature of each hydrocarbon compound of said cracking dispersion at the cracking pressure. Said cracking oil is therefore inert with respect to the catalytic cracking and moreover remains in the liquid state during catalytic cracking.

In some embodiments said cracking pressure is at most equal to 100 hPa, in particular at most equal to 60 hPa, preferably between 30 hPa and 50 hPa inclusive, and enables catalytic cracking of at least one—in particular of each—hydrocarbon compound at low temperature without formation of coke, dioxin and/or furans.

According to the invention the gas atmosphere is maintained at said cracking pressure by gas exchange communication between the gas atmosphere of said cracking reactor and the gas atmosphere of a device termed a primary condenser or thermochemical vacuum pump generating a reduced pressure because of a change of state—from an expanded gas state to a condensed liquid state—of a second inert oil known as the condensation oil, reflux heated to a temperature above the evaporation temperature of said condensation oil at said cracking pressure in said thermochemical vacuum pump, the change of state from the expanded gas state to the condensed liquid state being caused in said thermochemical vacuum pump in gas exchange communication with the gas atmosphere of said cracking reactor, said condensation oil being chosen so that it change of state temperature is at the level of said cracking temperature at said cracking pressure.

Said condensation oil is chosen to have a change of state temperature at the level of the cracking temperature when the pressure is at the level of said cracking pressure and above the condensation temperature (at said cracking pressure) of each valorization product formed by the catalytic cracking.

According to the invention, before initiation of catalytic cracking at low temperature the common gas atmosphere of the cracking reactor and of said thermochemical vacuum pump is brought to a so-called initiation pressure below said cracking pressure by any pumping means, for example by means of a mechanical pump (vacuum pump). Then, after initiation of cracking, the common atmosphere of the cracking reactor and said thermochemical vacuum pump is maintained at a reduced pressure by means of said thermochemical vacuum pump.

According to the invention the necessary energy input for maintaining the atmosphere of the cracking reactor at said cracking pressure is optimized and the overall energy balance of the production of these valorization products is also optimized.

Said condensation oil is inert with respect to catalytic cracking, that is to say undergoes no chemical modification when it encounters conditions of temperature and pressure specific to its changes of state and in contact with the valorization products in the gas state.

In said thermochemical vacuum pump in gas exchange communication with the gas atmosphere of said cracking reactor the change of state (evaporation) from the condensed liquid state to the expanded gas state of said condensation oil is caused by reflux heating of said condensation oil in a container known as a boiler, a heating member forming a lower part of said thermochemical vacuum pump and at a temperature above (slightly above) the evaporation temperature of said condensation oil at said cracking pressure.

According to the invention the change of state of said condensation oil from the expanded gas state to the condensed liquid state is initiated in a so-called lower condensation section of a tubular member of said thermochemical vacuum pump, the tubular member enabling routing of the valorization products formed in the cracking reactor because of the cracking to a fragmented condensation device,

- said condensation section being in gas fluid communication with the gas atmosphere of the cracking reactor,
- said condensation section being adapted to be able to receive the flow of said condensation oil in the gas state, to reduce the temperature of said condensation oil in the gas state to a temperature below the condensation temperature of said condensation oil at said cracking pressure, to enable condensation of the flow of said condensation oil from the expanded gas state to the condensed liquid state, and to generate the reduced pressure because of this condensation.

The change of state of said condensation oil from the expanded gas state to the condensed liquid state is induced in said condensation section the atmosphere in which is in gas fluid communication with the gas atmosphere of the cracking reactor. This change of state is caused by cooling the vapor of said condensation oil in said condensation section. This change of state produces in the atmosphere of said thermochemical vacuum pump and in the gas atmosphere of said cracking reactor a reduced pressure compensating an increase in pressure formed in the cracking reactor because of the production of the valorization products in the gas state formed because of the catalytic cracking. The temperature of the vapor (of said condensation oil and of the valorization products obtained from cracking) being maintained constant because of the respective heating thereof, any fluctuation in the pressure around the change of state pressure of said condensation oil and around said cracking pressure leads to intensification or stopping of the condensation of said condensation oil opposing this fluctuation.

After establishing said cracking pressure in the cracking reactor an increase in the pressure in the atmosphere of the cracking reactor (for example by increased production of valorization products) encourages condensation of said condensation oil from the expanded gas state to the condensed liquid state in said thermochemical vacuum pump and a reduction of the pressure compensating that augmentation. Conversely, a reduction of the pressure in the atmosphere of the cracking reactor (for example by reduced production of valorization products) encourages evaporation of said condensation oil from the condensed liquid state to the expanded gas state in said thermochemical vacuum pump and an increase of the pressure compensating that reduction. The pressure in the atmosphere of said thermochemical vacuum pump and in the atmosphere of said cracking reactor is stabilized at the level of said cracking pressure. Said thermochemical vacuum pump serves as a pump for maintaining a stable reduced pressure of the atmosphere of the cracking reactor.

The inventor has determined that it is possible and advantageous to maintain at reduced pressure—that is to say at a pressure below atmospheric pressure, in particular at a pressure at most equal to 100 hPa, in particular at most equal to 60 hPa, preferably between 30 hPa and 50 hPa inclusive—the gas atmosphere in contact with said cracking dispersion during cracking by means of said thermochemical vacuum pump. In said thermochemical vacuum pump said condensation oil is subjected at said cracking pressure to a dynamic succession of changes of state between an expanded gas state at a temperature slightly above the evaporation temperature of said condensation oil (at said cracking pressure) and a condensed liquid state at a temperature slightly below the evaporation temperature of said condensation oil in said condensation section. The pressure is stabilized at the level of said cracking pressure as soon as the temperature is maintained at the level of said cracking temperature by the adjustable heating means of said boiler and the cracking reactor. An augmentation of the pressure relative to said cracking pressure in the atmosphere of said condensation section and of the cracking reactor tends to halt the production of vapor and to cause the pressure to fall. A reduction of the pressure relative to said cracking pressure in the atmosphere of said condensation section and of the cracking reactor tends to encourage the production of vapor and to increase the pressure.

Said condensation section constitutes a lower part of the tubular member of said thermochemical vacuum pump, the tubular member enabling routing of the valorization products formed in the reactor because of the cracking to a fractionated condensation device adapted to enable selective condensation of the hydrocarbons and then, where applicable, separation by osmosis of carbon dioxide and dihydrogen gas. Said condensation section being in gas fluid communication with the gas atmosphere of the cracking reactor, it is adapted to be able to receive the flow of said condensation oil in the gas state, to reduce the temperature of said condensation oil in the gas state to a temperature below the condensation temperature of said condensation oil at said cracking pressure, to enable condensation of the flow of said condensation oil from the expanded gas state to the condensed liquid state, to generate the reduced pressure by virtue of this condensation, and to enable a return of said condensation oil to the condensed liquid state toward and in said boiler. The gas atmosphere of the cracking reactor is maintained at a pressure below said cracking pressure because of this condensation in said condensation section.

In some embodiments the change of state of said condensation oil from the expanded gas state to the condensed liquid state continues in the lower part of an intermediate so-called head loss section of the tubular member, surmounting said condensation section, and including a porous member including a metal mesh adapted:

- to enable an exchange of heat with said condensation oil and a change of state of said condensation oil from the expanded gas state to the condensed liquid state, and
- because of a head loss, to maintain dynamically a pressure difference between said condensation section and said upper part of the tubular member.

Said head loss section is adapted to maintain dynamically a pressure difference between said condensation section and an upper part of the tubular member extending above said head loss section.

The inventor has determined that controlled reflux condensation heating of said oil at a temperature (slightly) higher than its evaporation temperature at said cracking pressure is accompanied by a succession of changes of state of said condensation oil between the expanded gas state and the condensed liquid state and that this succession of changes of state enables instigation of a continuous dynamic regime of evaporation/condensation of said condensation oil in said thermochemical vacuum pump. This dynamic regime creates a vacuum space instantaneously filled in by an ascending current formed by the mixture of valorization productions in the gas state resulting from cracking and of the vapor of said condensation oil. Said condensation oil falling back into said boiler after condensation in said condensation section, the cracking vapor formed of valorization products in the gas state, it being impossible to descend against the rising current of greater mass per unit volume, accumulates in the upper part of said condensation section and at the bottom of said head loss section because of the effect of a dynamic pressure exerted by the upward current.

In these embodiments the porous member—formed in particular by a metal mesh of high density—is a member generating the head loss and enabling a dynamic pressure difference to be maintained between said condensation section and an upper so-called thermal tapping section of the tubular member.

In some embodiments the change of state of said condensation oil from the expanded gas state to the condensed liquid state is completed in said head loss section. In these embodiments the porous member of said head loss section—in particular the high-density metal mesh—is adapted to encourage exchanges of heat with said condensation oil to encourage the change of state of said condensation oil from the expanded gas state to the condensed liquid state initiated in said condensation section and completed in contact with the metal mesh of said head loss section, and to enable the reduced pressure in the cracking reactor to be maintained.

In some embodiments said head loss section may be provided with an external peripheral refrigerating sheath enabling completion of the condensation of the flow of said condensation oil from the expanded gas state to the condensed liquid state.

Reflux heating of said condensation oil makes it possible to form a flow of said condensation oil in the expanded gas state toward said condensation section and condensation in said condensation section of this flow of said condensation oil in the expanded gas state and to maintain over time a dynamic phase of condensation of said condensation oil generating a maintained reduction of pressure in said condensation section and at least in the lower part of said head loss section. Now, the inventor has determined that the valorization products in the gas state formed because of cracking and guided in said condensation section have a mass per unit volume less than the mass per unit volume of said evaporated condensation oil and are necessarily displaced to accumulate and to stagnate above a dynamic medium resulting from the condensation of said condensation oil. The head loss generated by said head loss section reinforces this stagnation and this accumulation of the valorization products in the gas state in the porous member—in particular in the dense metal mesh—of said head loss section and in particular in its upper part. This stagnation and this accumulation form dynamically an obstacle of a kind to maintain a pressure difference between the upper part of the tubular member and said condensation section in which the dynamic phase of condensation of said condensation oil continues enabling the gas atmosphere of said cracking reactor to be maintained at a reduced pressure.

Because of the effect of this dynamic pressure, the valorization products in the gas state form at a lower contact between said porous member and said metal mesh between a maximum pressure zone from which they are extracted by the organization of a reduced pressure in the upper part of said porous member and in said superposed thermal tapping section.

Without completely interrupting the circulation of the valorization products in the gas state, the head loss and the accumulation of valorization products in the gas state in the maximum pressure zone constitute a dynamic obstacle sufficient to be equivalent to closure of said reactor of a kind to prevent any disturbance of the cracking pressure. Without disturbing the functioning of said cracking reactor, the valorization products in the gas state are therefore extracted from the enclosed space formed by said cracking reactor via said condensation section and via said boiler and pass to said thermal tapping section.

In some embodiments, during catalytic cracking said condensation oil is heated to a temperature hardly above the evaporation temperature of said condensation oil at said cracking pressure in said boiler in the lower part of said thermochemical vacuum pump. Said condensation oil is therefore heated so as to achieve its evaporation temperature at said cracking pressure and to be evaporated, the temperature reached by said condensation oil being nevertheless higher than its evaporation temperature but sufficiently close to that evaporation temperature to enable sufficient and sufficiently rapid cooling of said condensation oil in said condensation section and in said head loss section, and its condensation generating a reduced pressure compensating the increased pressure generated by the production of the valorization products in the gas state in the cracking reactor.

In some embodiments during a preparatory step (prior to) catalytic cracking:

- a bath of said cracking oil is heated to said cracking temperature in the cracking reactor. In accordance with these embodiments the bath of said cracking oil being free of solid material, catalyst and alkaline substance, no catalytic cracking is produced in this bath during the preparation step prior to catalytic cracking;
- the gas atmosphere common to the cracking reactor and said thermochemical vacuum pump is brought to a so-called initiation pressure below said cracking pressure—in particular less than 10 hPa, preferably between 1 and 5 hPa inclusive—by pumping this gas atmosphere by means of a mechanical suction pump (vacuum pump);
- a bath of said condensation oil is heated in said boiler in the lower part of said thermochemical vacuum pump to a temperature below and close to the evaporation temperature of said condensation oil at said initiation pressure, after which
- the mechanical pumping of the gas atmosphere of the cracking reactor and of the thermochemical vacuum pump at the initiation pressure is interrupted—said initiation pressure being maintained in the gas atmosphere—after which
- said condensation oil is heated in said boiler of said thermochemical vacuum pump to a temperature above but close to the cracking temperature and the temperature of evaporation of said condensation oil at said cracking pressure, whereby hot vapor of said condensation oil rises in said condensation section of said thermochemical vacuum pump, in which the pressure increases from said initiation pressure and reaches said cracking pressure;
- the temperature being at the level of said cracking temperature and the pressure having reached said cracking pressure, the method according to the invention combines the conditions so that, depending on the nature of said condensation oil, the vapor of said condensation oil condenses in contact with said condensation section and in said head loss section, whereby, the temperature being maintained constantly at the level of said cracking temperature, there is established—in conformance with the definition of said condensation oil—a continuous evaporation/condensation regime maintaining the gas atmosphere of the cracking reactor at the level of said cracking pressure because of the continuity of the temperature at the level of said cracking temperature;
- thereafter, during a step of initiation of catalytic cracking a flow of said cracking dispersion and a flow of hot recycled cracking oil are introduced into and mixed at the same point of the cracking reactor so as to form a mixture at a sufficient temperature:
  - for said cracking dispersion to be heated to and maintained at said cracking temperature at said cracking pressure, whereby the cracking reaction is initiated and maintained, valorization products in the gas state are produced in the gas atmosphere at said cracking pressure, and
  - for said cracking temperature to be maintained in the cracking reactor and in particular for the enthalpy of evaporation of the valorization products and the heat losses through the walls of the cracking reactor to be compensated.

According to the invention, no continuous mechanical pump means for maintaining the gas atmosphere of the cracking reactor at reduced pressure is needed. In these embodiments said condensation oil is heated in said boiler by any means.

In some embodiments the valorization products in the gas state produced by the catalytic cracking accumulated in the lower part of said head loss section are driven into an upper so-called thermal tapping section of the tubular member of said thermochemical vacuum pump and then into a fractionated condensation device because of the effect of thermal tapping induced by introduction into the upper part of said thermochemical vacuum pump of a flow of a fuel in the liquid state, in particular a liquid fuel formed by the fragmented condensation of valorization products formed by the catalytic cracking, the fuel in the liquid state evaporating as it progresses in said thermal tapping section in the direction of said head loss section, the fuel evaporated in this way being at a temperature below the temperature of the valorization products in the gas state formed by the catalytic cracking;

- the flow of evaporated fuel making it possible, because of a difference between the mass per unit volume and the temperatures of the ascending and descending flows, ascending by thermal tapping of the flow of valorization products in the gas state to the fractionated condensation device, by thermal tapping in accordance with the principle whereby the peripheral descent of the colder gas of higher mass per unit volume than the mass per unit volume of the axial hotter gasses leads to axial driving of the gas of lower mass per unit volume. According to these embodiments the valorization products in the gas state produced by the catalytic cracking are extracted from said head loss section and driven in the upper part of said thermochemical vacuum pump toward a fractionated condensation device because of thermal tapping created in said thermal tapping section by introduction into the upper part of said tubular member of a flow of a liquid fuel, in particular of a liquid fuel formed by the catalytic cracking.

In some embodiments the valorization products in the gas state resulting from catalytic cracking are extracted from said head loss section by the effects created in a so-called thermal tapping section constituting the upper part of the tubular member:

- of a reduced pressure created in the fractionated condensation device because of the condensation of energy products—in particular alkanes—in the fractionated condensation device, and
- the thermal tapping.

According to these embodiments the evaporated fuel as it progresses in said thermal tapping section in the direction of said head loss section being at a temperature below the temperature of the gas products formed by the catalytic cracking and its mass per unit volume being greater than the mass per unit volume of the same gas products, the flow of evaporated fuel enables progress of the flow of the valorization products in the gas state toward the condensation device, in accordance with the principle whereby the peripheral descent of the colder gas products of greater mass per unit volume than the mass per unit volume of the axial hotter gas products leads to the gas products of lowest mass per unit volume being driven upwards.

According to these embodiments the descending flow of fuel is heated and evaporated in contact with the ascending flow of valorization products in the gas state produced by the catalytic cracking and recycled in said thermochemical vacuum pump and/or in the fractionated condensation device. The inventor has determined that, subject to a sufficient height of said thermal tapping section, sufficient thermal tapping is obtained by introduction of a corresponding quantity of fuel of the order of 15% to 20% of the fuel produced and reintroduced at its distillation outlet temperature.

According to some embodiments said cracking dispersion is heated in the cracking reactor by mixing a flow of said cracking dispersion and a flow of said cracking oil—in particular of a flow of said recycled cracking oil—heated beforehand to a temperature above said cracking temperature at said cracking pressure of each hydrocarbon compound of the solid material in the fragmented state, the mixing being carried out so that said cracking dispersion reaches said cracking temperature (between 260° C. and 280° C. inclusive) at said cracking pressure without formation of coke, dioxins and/or furans, because of the recourse to heating of said cracking dispersion by mixing with a flow of said cracking oil at a temperature (for example between 310° C. and 320° C. inclusive) below the temperature (360° C. in the presence of coke already formed) of thermal cracking of said solid material. According to these embodiments said cracking dispersion is heated so as to achieve said cracking temperature—in particular said cracking temperature at said cracking pressure—by mixing a flow of said cracking dispersion at a temperature below said cracking temperature of each hydrocarbon compound of said cracking dispersion and a flow of said cracking oil heated prior to mixing to a temperature above said cracking temperature of at least one—in particular each—hydrocarbon compound of said cracking dispersion and so that the mixture formed reaches and exceeds said cracking temperature of at least one—in particular each—hydrocarbon compound of said cracking dispersion. According to this embodiment, prior to mixing the flow of said cracking dispersion is at a temperature below said cracking temperature of each hydrocarbon compound of said cracking dispersion and is also at a temperature below the temperature of formation of coke, dioxins and/or furans. Said cracking oil heated before mixing to a temperature above said cracking temperature of at least one—in particular all—hydrocarbon compound(s) is free of catalyst, alkaline compounds and hydrocarbon compounds, and does not allow the formation of coke, dioxins and/or furans. In this embodiment said cracking dispersion reaches said cracking temperature with no coming of said cracking dispersion into contact with a wall of a heat exchanger heated to a temperature necessarily higher than the temperature of formation of coke, dioxins and/or furans (360° C. to 400° C.), so that said cracking dispersion reaches at its heart said cracking temperature at said cracking pressure.

In some possible embodiments said cracking dispersion is maintained at said cracking temperature at said cracking pressure by feeding into said cracking dispersion a flow of an oxygenated composition comprising dioxygen ($O_2$) gas able to cause an exothermic reaction of combustion of dihydrogen ($H_2$) gas formed because of catalytic cracking by dioxygen ($O_2$) gas in said cracking dispersion.

In some embodiments said cracking dispersion is brought to and/or maintained at said cracking temperature of at least one—in particular each—hydrocarbon compound of said cracking dispersion by introduction into said cracking dispersion, prior to or during cracking, of a controlled flowrate of an oxygenated composition as fuel adapted to be able to react without ignition by controlled exothermic combustion of dihydrogen ($H_2$) gas formed in said cracking dispersion because of catalytic cracking. This exothermic combustion advantageously enables in situ compensation of the evaporation enthalpy of the valorization products—in particular fuels—formed by cracking, continuation of cracking and evaporation of the valorization products formed, without formation of coke, dioxins and/or furans.

In some embodiments the flow of oxygenated composition is added to said cracking dispersion before said cracking dispersion reaches said cracking temperature. The fact that a controlled quantity of dioxygen ($O_2$) gas is present in said oxygenated cracking dispersion before the latter reaches said cracking temperature, that is to say the dioxygen ($O_2$) gas is distributed in said oxygenated cracking dispersion prior to cracking, enables when said oxygenated cracking dispersion reaches said catalytic cracking temperature and dihydrogen ($H_2$) gas is produced, that as soon as it is formed, this dihydrogen ($H_2$) gas participates with the dioxygen ($O_2$) gas in an exothermic reaction of combustion of the dihydrogen ($H_2$) gas that is perfectly controlled because of the control of the flow of the oxygenated composition.

The exothermic reaction of controlled combustion of the dihydrogen ($H_2$) gas enables compensation at least in part of the enthalpy of the endothermic evaporation of the valorization products and the temperature of said oxygenated cracking dispersion to be maintained at a temperature enabling catalytic cracking to continue and the entry of valorization products in the gas state into the distillation phase.

In some embodiments such introduction in the initial cracking phase is carried out so as to enable endogenous production of thermal energy enabling the temperature of said cracking dispersion to be increased so that it reaches said cracking temperature of each hydrocarbon compound of said cracking dispersion at the cracking pressure.

According to some embodiments such introduction is carried out in the terminal cracking phase so as to enable endogenous production of thermal energy making it possible to encourage the maintaining in the gas state of the hydrocarbons formed during the cracking reaction by compensation of the evaporation enthalpy of the hydrocarbons formed.

In some embodiments said cracking dispersion is subjected to treatment by ultrasound during catalytic cracking. Such treatment by ultrasound enables by ultrasound vibratory mechanical action as homogeneous a distribution as possible of the reactive and catalytic species during cracking.

According to some embodiments at least one valorization product in the gas state formed by the catalytic cracking is condensed under conditions allowing formation of a fuel in the liquid state. In some embodiments fractionated condensation of the valorization products in the gas state is carried out under conditions suitable for fractionation of the valorization products and forming valorization products—in particular fuels—separated from one another. This separation is performed by fractionated condensation by any known means, for example by means of a fractionated distillation device. Such a separation by fractionated condensation is performed at atmospheric pressure.

According to some embodiments at least one of the following steps is carried out:

- a step of separation of the valorization products and water (which is not considered a valorization product formed by the catalytic cracking of a hydrocarbon compound but may be formed by combustion of dihydrogen formed during cracking and of oxygen from an insufficiently deoxygenated solid material) by condensation of a condensate formed of valorization products by means of a water-cooled condenser,
- a step of distillation of the condensate at atmospheric pressure under appropriate conditions for separating the various fuels, in particular gas oil, kerosene and gasoline,
- a step of elimination of water by distillation,
- a step of separation by osmosis of the carbon dioxide and dihydrogen.

In some embodiments an uncondensed gas phase is collected during this separation by fractionated condensation of gas valorization products to form liquid valorisation products, the uncondensed gas phase possibly including in particular short-chain saturated hydrocarbons and/or excess dihydrogen ($H_2$) gas following cracking and/or carbon dioxide ($CO_2$), and the incondensable gas phase is subjected to at least one step of separation/purification by osmosis of dihydrogen ($H_2$) gas, short-chain saturated hydrocarbons and carbon dioxide ($CO_2$). In these embodiments osmosis or any other means is used to separate carbon dioxide from other residual gases from said condensation. Carbon dioxide is extracted from residual gas products of said condensation by osmosis or any other appropriate means.

The invention also concerns a device for catalytic cracking at low temperature of a fragmented solid material without formation of coke, dioxins and/or furans, the device including a gastight cracking reactor adapted to heat a flow of a so-called cracking dispersion composition, including

- a first oil, referred to a cracking oil, which is inert against the catalytic cracking,
- a fragmented solid material including at least one hydrocarbon compound,
- at least one catalytic cracking catalyst, and
- at least one alkaline compound,
- at a so-called cracking temperature between 250° C. and 300° C. inclusive and chosen to enable production of at least one valorization product in the gas state, in particular at least one valorization product chosen in the group formed by carbon dioxide, energy products such as fuels and dihydrogen, by the catalytic cracking of at least one hydrocarbon compound of the fragmented solid material in said cracking dispersion,
- and to maintain said cracking dispersion in contact with a gas atmosphere in the cracking reactor,
- the cracking device being characterized in that it includes means, in particular thermochemical means, adapted to maintain the gas atmosphere at a so-called cracking pressure below atmospheric pressure.

The invention concerns in particular a catalytic cracking device adapted to be usable to execute a method according to the invention.

In accordance with the invention the catalytic cracking device according to the invention includes a so-called primary condenser or thermochemical vacuum pump device in gas exchange communication with the gas atmosphere of said cracking reactor, said thermochemical vacuum pump being adapted to enable a change of state of a second inert, so-called condensation oil, the condensation temperature of which is above the condensation temperature of each valorization product formed because of the catalytic cracking, from the expanded gas state to the condensed liquid state, said condensation oil being heated to a temperature above its evaporation temperature at said cracking pressure, and to maintain the gas atmosphere of the cracking reactor at said cracking pressure because of a reduced pressure created because of this change of state.

According to these embodiments said thermochemical vacuum pump includes a tubular member oriented substantially vertically, a so-called condensation section of which is in gas exchange communication with the gas atmosphere of said cracking reactor. Said thermochemical vacuum pump being adapted to enable a change of state of a second inert oil, known as condensation oil, from the expanded gas state to the condensed liquid state, said condensation oil being chosen to have a condensation temperature above the condensation temperature of each valorization product formed by the catalytic cracking and equal to the cracking temperature when the pressure is at the level of the cracking pressure. Said boiler extending at the base and communicating with said condensation section is adapted to heat said condensation oil to a temperature above its evaporation temperature. The pressure in said boiler having been lowered beforehand, in particular by mechanical evacuation means, to a level below the cracking pressure, the pressure rises because of the effect of the heating and the evaporation of said condensation oil at a temperature above its evaporation temperature at said cracking pressure. When the pressure in said condensation section in communication with said reactor reaches said cracking pressure a slight drop in temperature leads by definition to the condensation of the vapor of said condensation oil: the pressure is stabilized at the level of the cracking pressure, and the adjustable temperature being constant, any fluctuation up or down of the pressure will lead to modification in the opposite sense of the condensation flow.

Said thermochemical vacuum pump is adapted to maintain the pressure of the gas atmosphere of said cracking reactor at the level of said cracking pressure by means of a pressure reduction created by condensation of said condensation oil, evaporated beforehand by heating at said cracking pressure and at a temperature level slightly above the level of its change of state temperature at said cracking pressure, the pressure in said condensation section of said thermochemical vacuum pump and in the gas atmosphere of said reactor having been lowered beforehand, using mechanical means, below the level of the cracking pressure.

According to some embodiments said thermochemical vacuum pump includes:

- a member known as a boiler for heating said condensation oil to said evaporation temperature, and
- a tubular member for routing valorization products in the gas state formed in the cracking reactor because of the cracking to a distillation device, the tubular member surmounting the heating member and discharging into the heating member and forming:
  - a so-called lower condensation section in gas fluid communication with the gas atmosphere of the cracking reactor and adapted to be able to receive the flow of said condensation oil in the gas state to lower its temperature to a temperature below the evaporation temperature of said condensation oil at said cracking pressure, to enable condensation of the flow of said condensation oil from the expanded gas state to the condensed liquid state, and to maintain the pressure of the gas atmosphere of the cracking reactor at said cracking pressure,
  - an intermediate so-called head loss section surmounting said condensation section, provided with a porous member including a metal mesh, adapted to complete the change of state of said condensation oil from the expanded gas state to the condensed liquid state,
- said condensation section being in gas exchange communication with said head loss section and with the gas atmosphere common to the cracking reactor and said thermochemical vacuum pump.

According to these embodiments said condensation section extends continuously downward from the heating member and upward to said head loss section, and said head loss section extends continuously downward from said head loss section and upward to a so-called thermal tapping section, driving valorization products from said head loss section to a fractionated condensation device.

Said condensation section is adapted to be able to receive the flow of said condensation oil in the gas state to lower the temperature of said condensation oil in the gas state to a temperature below the evaporation temperature of said condensation oil at said cracking pressure to enable condensation of the flow of the said condensation oil from the expanded gas state to the condensed liquid state, and to maintain the pressure of the gas atmosphere of the cracking reactor at said cracking pressure.

Said head loss section is adapted to create dynamically an obstacle to the circulation of the valorization products in the gas state without preventing that circulation, however, but sufficient to maintain different pressure states between the bottom and the top of the tubular member.

According to some embodiments the tubular member forms a so-called upper thermal tapping section extending downward from said head loss section and adapted to drive the valorization products in the gas state toward the fractionated condensation device,

- said thermal tapping section being provided in its upper part with an inlet—in particular a peripheral inlet—for a flow of valorization products in the liquid state in said thermal tapping section, enabling progress—in particular rising—of the valorization products in the gas state toward the fractionated condensation device by reinforcement of the thermal tapping in the tubular member and entry of these valorization products into the fractionated condensation device.

In these embodiments the evaporation of the valorization products in the liquid state forms a descending flow of vapor inducing rising of the valorization products in the gas state produced by the cracking by reinforced thermal tapping in the tubular member because of the cumulative effect of the difference of the masses per unit volume of the gases present and a reduced pressure formed in the fractionated condensation device contiguous therewith because of this condensation.

According to some embodiments the fractionated condensation device is a device for distillation/condensation of at least one valorization product in the gas state and its conversion into liquid fuel.

According to some embodiments the cracking reactor has an internal face in contact with said cracking dispersion at said cracking temperature, the internal face of the cracking reactor being coated with a layer of ceramic adapted to oppose the formation of coke in contact with the iron and/or nickel constituting the wall of the cracking reactor.

According to some embodiments the device according to the invention includes in one piece at least two of the elements necessary for:

- preparing, heating and routing a flow of said cracking dispersion in the cracking reactor,
- preparing—in particular recycling, collecting by overflow from said cracking reactor—and heating to a temperature above said cracking temperature of each hydrocarbon compound and below the 360° C. threshold of thermal decomposition and potential formation of coke and routing a flow of said cracking oil in the cracking reactor,
- in the cracking reactor at said cracking pressure, mixing the flow of said cracking dispersion and the flow of said hot cracking oil, whereby the catalytic cracking reaction occurs without formation of coke,
- placing said cracking dispersion in contact with the gas atmosphere in the cracking reactor at said cracking pressure, below atmospheric pressure,
- condensing the valorization products in the gas state formed by the catalytic cracking and producing the fuel or fuels in the liquid state, recycling said cracking oil to the catalytic cracking outlet,
collecting the catalyst at the cracking outlet to recycle it,
organising the feeding and maintaining in suspension of the catalyst in the reactor, and
collecting a residual fraction of the catalyst following cracking with a view to recycling it.

The invention also concerns a method and a device for catalytic cracking of a solid hydrocarbon material characterized, in combination or otherwise, by some or all of the features mentioned hereinabove or hereinafter. Whatever the formal presentation thereof given, unless explicitly indicated to the contrary, the various features mentioned hereinabove or hereinafter must not be considered as closely or inextricably linked, the invention possibly concerning only one of these structural or functional features or only some of the structural or functional features or only a part of one of these structural or functional features, or any grouping, combination or juxtaposition of some or all of these structural or functional characteristics.

BRIEF DESCRIPTION OF THE DRAWINGS

Other objects, features and advantages of the invention will become apparent on reading the following non-limiting description of some possible embodiments thereof with reference to the appended figures, in which FIG. 1 and FIG. 2 form a representation in two juxtaposed parts of a cracking device according to one particular embodiment of the invention, in which.

DETAILED DESCRIPTION

Figure 1:
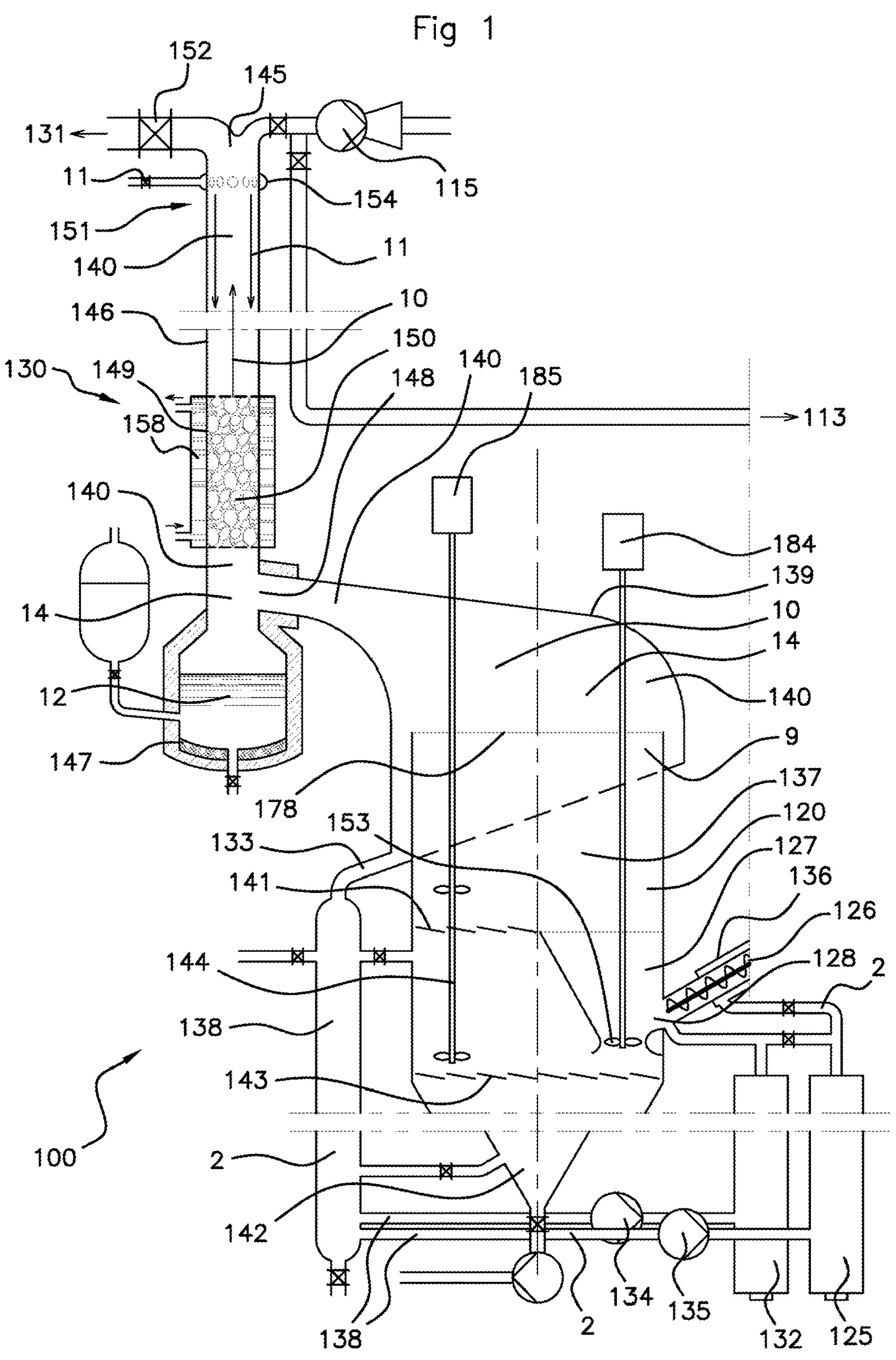
FIG. 1 is a schematic representing one particular embodiment of a cracking device 100 according to the invention.
Figure 2:
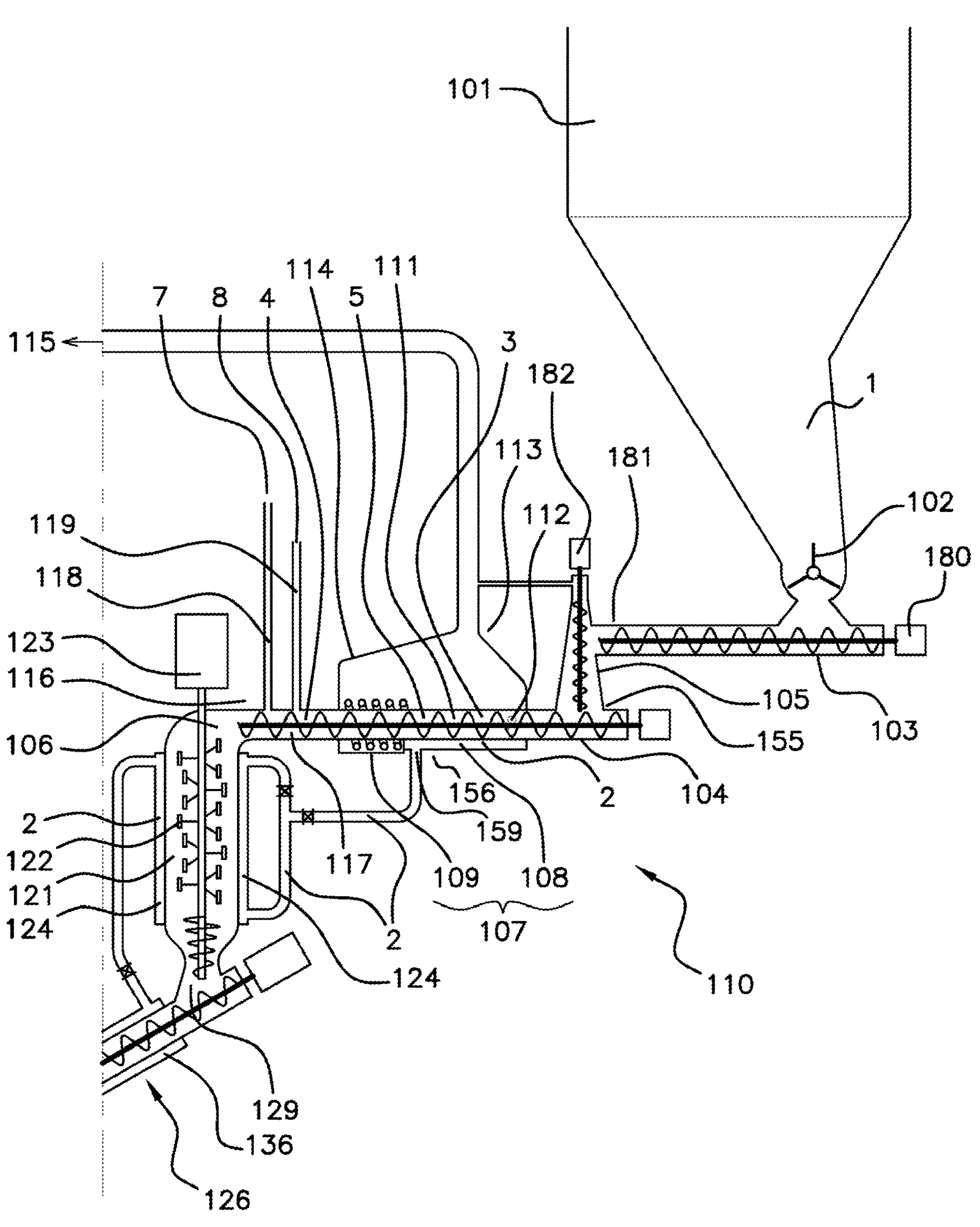
FIG. 2 is a schematic complementary to FIG. 1 representing one particular embodiment of a method and a unit 110 for preparation of a cracking dispersion prior to its introduction into the cracking device 100 represented in FIG. 1.

In FIGS. 1 and 2 the scale and the proportions are not necessarily strictly conformed to, purely for reasons of clarity of illustration. Throughout the text the terms "upstream" and "downstream" are defined relative to the direction of flow of a solid so-called hydrocarbon material 1 in the fragmented state and including at least one hydrocarbon compound and/or said hydrocarbon dispersion 3 and/or said dried dispersion 4 and/or said degassed dispersion 5 and/or said cracking dispersion 6 between an upstream storage hopper 101 for supplying the cracking device 100 and a cracking reactor 120 and relative to the direction of flow of the valorization products 10 formed by the catalytic cracking between the gas atmosphere of the cracking reactor 120 at a pressure below atmospheric pressure toward a thermochemical vacuum pump 130 or primary condenser 130 for maintaining the gas atmosphere of the cracking reactor 120 at reduced pressure, and toward a fractionated condensation device 131 for the valorization products 10 formed and for production of fuel 11. The terms "lower", "upper", "top" and "bottom" are to be understood relative to the cracking device in the operating state, that is to say in which the bath of said cracking oil fills the bottom of the cracking reactor in the bottom part of the device and the member for collecting vapor formed during cracking lies in the upper part of the device.

A schematic representation of one particular embodiment of a device 100 according to the invention for cracking said hydrocarbon material 1—in particular waste—is represented in FIG. 1. The cracking device 100 includes at its upstream end a unit 110 for preparing a flow of a hydrocarbon dispersion 3 of said hydrocarbon material 1 in a first, so-called cracking oil 2 inert with respect to catalytic cracking. The preparation unit 110 includes for example a hopper 101 for storing said hydrocarbon material 1 in the fragmented state and supplying the cracking device 100 with said hydrocarbon material 1. According to some advantageous embodiments said hydrocarbon material 1 is in the form of solid fragments having a greatest dimension less than the order of 20 mm and at least one dimension less than or equal to 3 mm, in particular of the order of 2 mm. Said hydrocarbon material 1 is preferably in the form of solid particles having a specific area less than or equal to 10 $cm^2$ and a thickness less than or equal to 3 mm, in particular and preferably less than 2 mm. Of course, there is nothing to prevent provision of means for fragmentation of said hydrocarbon material 1. The hydrocarbon material 1 is fragmented by any appropriate method, in particular by extrusion of said hydrocarbon material 1 in an extruder—for example a single-screw or twin-screw extruder—or by laceration of the hydrocarbon material 1 to form a fragmented hydrocarbon material 1.

Said hydrocarbon material 1 is chosen to include at least one hydrocarbon compound, that is to say at least one compound formed mainly of atoms of carbon and atoms of hydrogen. It may be a material formed exclusively of hydrocarbon compounds. It may also be a material including at least one hydrocarbon compound and at least one compound free of carbon and hydrogen. A hydrocarbon material of this kind may include at least one hydrocarbon compound including at least one heteroatom such as, for example, oxygen (O), nitrogen (N), phosphorous (P), sulfur(S), or at least one halogen (CC, Br, F, I), etc. Said hydrocarbon material 1 may be a material including a hydrocarbon compound obtained from biomass. Said hydrocarbon material 1 may be waste, that is to say an unused part of a material, this unused part necessitating elimination by incineration and/or appropriate processing with a view to storing it. It may for example be industrial waste, agricultural waste-such as non-valorized parts of plants—or domestic waste obtained after mechanical sorting intended to separate out inert materials-such as glass—or materials that cannot be transformed. It may be solid waste containing at least one hydrocarbon compound, in particular at least one organic compound, cellulose material and/or synthetic polymer materials. Such waste may be substantially free of putrescible material. However, in the case of domestic waste such waste may include putrescible materials. Such waste may be formed by a treatment to compress domestic waste in an appropriate press so as to be able to separate putrescible materials and combustible materials from this domestic waste. Such separation can for example be carried out by means of an extruder press, for example as described in EP 0 563 173. Generally speaking, such fragmented solid waste in the raw state can have a moisture content between 10% and 30% inclusive. For example, domestic waste is subjected to compression to a pressure greater than 750 bar under conditions appropriate for extracting water and a fraction that can be fermented in the form of wet pulp and to form the solid hydrocarbon material—in particular the waste.

The hopper 101 for storing the solid material 1 in the fragmented state and including at least one hydrocarbon compound and for supplying the cracking device 100 with that solid material 1 is provided with at least one member 102 for controlling the flow of said hydrocarbon material 1 delivered by the hopper 101 in a conveyor 103 for transferring the fragmented solid material 1 into a conveyor 104 for drying and deoxygenation of the solid material 1. The control member 102 enables adjustment of the flow of fragmented solid material 1 introduced into the cracking device 100 so as to be able to control the catalytic cracking reaction in a downstream cracking reactor 120 and to prevent all obstruction of the pipes supplying the cracking reactor 120 with catalytic cracking reagents. The transfer conveyor 103 may be of any type and of any length provided that it enables reliable and regular routing of the fragmented solid material 1 and its introduction into the drying conveyor 104. The transfer conveyor 103 may be a lead screw conveyor driven in rotation by a motor 180—in particular an electric motor-known in itself.

In some embodiments that are not represented the member for controlling and adjusting the flow of the fragmented solid material 1 introduced into the cracking device includes a metering device for controlled introduction of said hydrocarbon material in the fragmented state into the drying/deoxygenation conveyor and adapted to maintain the internal volume of the drying/deoxygenation conveyor and the degassing member at reduced pressure during actuation of the metering device.

The drying/deoxygenation conveyor 104 represented in FIG. 1 includes in its upstream part 155 a frustoconical conveyor 105 with a substantially vertical axis widening in the downward direction enabling guiding and routing of the fragmented solid material 1, assisted by gravity, the frustoconical pipe 105 extending between and forming a junction between the downstream end of the transfer conveyor 103 and discharging into the upstream part 155 of the drying/deoxygenation conveyor 104. The frustoconical conveyor 105 is equipped with a rotary screw driven in rotation by a motor 182, the rotary screw cooperating with the frustoconical pipe 105 to enable the flow of fragmented solid material 1 to fall by gravity into the upstream part 155 of the drying/deoxygenation conveyor 104.

The drying/deoxygenation conveyor 104 is of the type including a lead screw driven in rotation by a motor 183 about a substantially horizontal longitudinal axis. The drying/deoxygenation conveyor 104 is provided with means 107 for heating the fragmented solid material 1 to a maximum temperature of 180° C. and a minimum temperature of 102° C., in particular a temperature between 102° C. and 130° C. inclusive. The heating means 107 enable evaporation and extraction of water 14 in the form of steam during transportation of the fragmented solid material 1 in an intermediate part 156 of the drying/deoxygenation conveyor 104. This drying makes it possible to facilitate the dispersion of the fragmented solid material 1 in said cracking oil 2 and to guarantee the absence of free water. The heating means 107 of the drying/deoxygenation conveyor 104 also include an external sheath 108 for heating by conduction the drying/deoxygenation conveyor 104 adapted to receive a flow of said hot cracking oil 2, in particular a flow of said cracking oil 2 recycled and heated following and because of catalytic cracking. The external sheath 108 faces the intermediate part 156 of the drying/deoxygenation conveyor 104 and enables an exchange of heat between said hot cracking oil 2 circulating in the external sheath 108 and the hydrocarbon dispersion 3 circulating in the drying/deoxygenation conveyor 104 and heating of the hydrocarbon dispersion 3.

The flow of said hot cracking oil 2 may be at a temperature between 150° C. and 200° C. inclusive—in particular of the order of 180° C. to 190° C.—at the inlet 159 of the external sheath 108. The external heating sheath 108 discharges into the internal space 111 of the drying/deoxygenation conveyor 104 via orifices 112 for communication of said cracking oil, the orifices 112 being formed in the external wall of the conveyor 104, whereby said hot cracking oil 2 is brought into contact with the fragmented solid material 1 to form a so-called hydrocarbon dispersion 3 of this solid material 1 dispersed in said hot cracking oil 2.

There is nothing to prevent providing the heating external sheath 108 with additional means 109 for heating by induction a degassed dispersion 5 adapted and controlled to bring the degassed dispersion 5 and the solid material 1 of the degassed dispersion 5 to a temperature substantially greater than 100° C.—in particular a temperature between 100° C. and 280° C. inclusive—ensuring virtual absence of residual water in the degassed dispersion 5 and in the dry material dispersed in said hot cracking oil 2.

In some embodiments a drying step 175 is carried out beforehand so that there remains in the fragmented solid material 1 substantially only the water from the fragmented solid material, that is to say the water constituting and not extractable from the fragmented solid material.

There is nothing to prevent carrying out an additional step 175 of adjusting the particle size range of the starting fragmented solid material 1 and/or of the fragmented solid material 1 in the hydrocarbon dispersion 3 and/or the fragmented solid material 1 in the dried dispersion 4 and/or the fragmented solid material 1 in the degassed dispersion 5 and/or the fragmented solid material 1 in said cracking dispersion 6. Such adjustment of the particle size range is carried out by any appropriate fragmentation means.

The intermediate part 156 of the drying/deoxygenation conveyor 104 is provided with a degassing member 113 including a bell 114 maintained at a reduced pressure—that is to say at a pressure below atmospheric pressure—by a mechanical aspirator pump 115. The drying/deoxygenation conveyor 104 enables the formation of a degassed—in particular at least partially deoxygenated—and dried dispersion 5 of the fragmented solid material 1 in said cracking oil 2.

According to some embodiments this deoxygenation is carried out by maintaining the dispersion of the fragmented solid material 1 in contact with a gas atmosphere having an oxygen partial pressure below the oxygen partial pressure of atmospheric air. For example, such deoxygenation is carried out by maintaining the dispersion of the solid material 1 in the fragmented state in said cracking oil 2 in contact with an atmosphere formed of an inert gas. There is nothing to prevent carrying out such deoxygenation by maintaining the dispersion in contact with atmospheric air at a pressure below atmospheric pressure.

Such degassing and such deoxygenation 177 of the dried fragmented solid material 1 dispersed in said hot cracking oil 2 enables as precise as possible control of a reaction of exothermic combustion of dihydrogen ($H_2$) in the gas state produced during cracking by dioxygen ($O_2$) gas present in said cracking dispersion 6. As a matter of fact, in some embodiments of a method according to the invention of producing valorization products—in particular fuel—by the catalytic cracking of a solid material—in particular waste-containing biomass, that is to say a material consisting at least in part of material of plant origin and/or of material of animal origin and liable to form dihydrogen ($H_2$) in the gas state during cracking, it is necessary to prevent this uncontrolled exothermic combustion reaction so as to prevent any uncontrolled heating of said cracking dispersion 6. According to other embodiments it is necessary to be able to prevent consumption of dihydrogen ($H_2$) in the gas state produced during cracking, dihydrogen ($H_2$) in the gas state being a valorization product looked for in these embodiments.

Such deoxygenation 177 enables limitation to a controlled value of the quantity of molecular oxygen ($O_2$) present in the dispersion of the fragmented solid material 1 in said cracking oil 2. It also makes it possible to limit by controlling it the exothermic combustion of the dihydrogen ($H_2$) during the catalytic cracking reaction, which is liable to lead:

- to random formation of water vapor and uncontrolled increase in the temperature of the vapor given off during the cracking reaction, such increase in the temperature of the vapor being of a kind to oppose the condensation of the valorization products, in particular of the fuel,
- to an uncontrolled increase in the temperature of said cracking dispersion in said cracking chamber, in particular to a temperature of the order of 600° C. (observed when the deoxygenation step is not carried out), which temperature is incompatible with a cracking reaction without formation of coke.

The drying/deoxygenation conveyor 104 has a downstream end 116 for circulation of the dispersion 4 of the dried and degassed solid material 1 in said cracking oil 2. This downstream end 116 of the drying/deoxygenation conveyor 104 forms a pipe 117 for preparation of a cracking dispersion 6 into which discharges a pipe 118 supplying a flow of cracking catalyst 7 and a pipe 119 supplying a flow of alkaline product 8 in the preparation pipe 117. The downstream end 106 of the preparation pipe 117 discharges into a mixing chamber 121 provided with means 122 for vigorous mixing of the mixture formed that is driven in rotation about a vertical rotation axis by the drive member 123. The mixing means 122 are chosen to encourage contact between the constituents of said cracking dispersion 6, that is to say between said hydrocarbon material 1, the cracking catalyst 7, the alkaline compound 8 and said cracking oil 2. Nothing prevents the mixing chamber 121 from being a chamber for mixing said cracking dispersion 6 and shredding of the solid material 1.

The alkaline compound(s) 8 is/are supplied in sufficient quantity or quantities for the pH of said cracking dispersion 6 to be greater than 8.5 in particular between 8 and 9 inclusive. This kind of pH value on the one hand makes it possible to encourage—in particular to allow—the catalytic cracking reaction. It also makes it possible to limit corrosion of the components of the cracking device 100 that come into contact with a cracking dispersion 6. It also makes it possible to carry out catalytic cracking of chlorinated hydrocarbon compounds. In some embodiments of a method according to the invention lime or calcium oxide (CaO) is used as the alkaline compound 8.

Said cracking oil 2 is an oil that is inert with respect to the catalytic cracking, that is to say an oil that does not undergo any chemical modification when it is placed in conditions (catalyst, temperature, etc.) for cracking and transformation of hydrocarbon compounds of the solid material in the fragmented state into valorization products. It may be a mineral oil that is inert with respect to catalytic cracking and stable at said cracking temperature. Said cracking oil 2 is formed of a mineral oil in the liquid state at said cracking temperature, in the liquid state at ambient temperature and in the liquid state at a temperature of 0° C. Said cracking oil 2 may have a density less than the density of the cracking catalyst 7 and less than the density of said hydrocarbon material 1. According to some embodiments said cracking oil 2 has a specific gravity of the order of 0.85.

Said cracking oil 2 may be a recycled inert oil, for example based on the catalytic cracking foam 9 in the process of expansion formed because of the cracking of said cracking dispersion 6, by liquid/solid separation of said cracking oil 2 from the cracking foam 9 in the process of expansion and solid materials (catalyst, solid residues, etc.). This separation may be effected by any means. It may be effected by means of a liquid/solid separation device in which solid materials of high density settle out. It may be a liquid/solid separation device that filters out and retains fragmented solid materials. It may be a floatation type liquid/solid separation device enabling separation of said recycled cracking oil 2 and solid materials of higher density than said cracking oil 2 and materials of lower density than said cracking oil 2.

At least one cracking catalyst 7 is a catalyst for catalytic cracking of hydrocarbon compounds into hydrocarbons. At least one cracking catalyst 7 is chosen in the group formed of potassium silicates, sodium silicates, calcium silicates, magnesium silicates, aluminum silicates, magnesium and aluminum silicates, zeolite and bentonite. Other cracking catalysts may be used. Catalysts of this kind are moreover catalysts of relatively low cost. At least one cracking catalyst 7 is a solid in the fragmented state.

The flow of the fragmented so lid material 1 containing at least one hydrocarbon compound, the flow of the cracking catalyst or catalysts 7, the flow of the alkaline compound or compounds 8—in particular of the lines—and the flow of said cracking oil 2 that is not spent or recycled are adapted appropriately to respect their proportions in said cracking dispersion 6.

In some embodiments the mixing is done so that said cracking dispersion 6 has a ratio between the volume of solid material 1 in the fragmented state and the volume of said cracking dispersion 6 that is between of the order of 20% and of the order of 50% inclusive.

The mixing chamber 121 is equipped with an external sheath 124 for heating said cracking dispersion 6 during mixing in the mixing chamber 121 and into which is drawn a flow of said hot cracking oil 2 heated by first means 125 for heating said cracking oil 2 to a temperature below said cracking temperature of each hydrocarbon compound of said cracking dispersion 6 (at said cracking pressure) and below the temperature for formation of coke, dioxins and/or furans. The first means 125 for heating said cracking oil 2 are disposed upstream (in the direction of circulation of said cracking oil 2) of the peripheral sheath 124 so that the flow of said hot cracking oil 2 heated by the first heating means 125 flows in the peripheral sheath 124 and then in the external sheath 108 for heating the drying/deoxygenation conveyor 104 and discharges into the internal space 111 of the drying/deoxygenation conveyor 104 via the orifices 112 for introduction of the flow of said hot cracking oil 2 in contact with the fragmented solid material 1. Preheating of the fragmented solid material 1 with a view to its drying/deoxygenation and heating said cracking dispersion 6 are therefore optimized and the cost necessary for this heating is minimized.

The cracking dispersion 6 mixed in the mixing chamber 121 is driven to the outlet 129 of the mixing chamber 121 and taken up by a screw conveyor 126 for supplying and introducing said cracking dispersion 6 into a mixing chamber 127 for initiation of the reaction of the cracking reactor 120. The conveyor 126 for introducing said cracking dispersion 6 into the mixing chamber 127 discharges into the mixing chamber 127 in a zone 128 in which there converge the flow of said cracking dispersion 6 and a flow of said cracking oil 2 heated beforehand to a temperature above said cracking temperature of at least one hydrocarbon compound of said fragmented hydrocarbon material 1 so that the mixture reaches, at least in convergence zone 128, a temperature above said cracking temperature of at least one hydrocarbon compound. Cracking is initiated. The supply conveyor 126 is provided with a peripheral sheath 136 for circulation of a flow of said heating oil 2 heated by heating means 125, 132, this flow and the temperature of said hot cracking oil 2 being adjusted to enable heating of said cracking dispersion 6 as close as possible to said cracking temperature of at least one hydrocarbon compound of the fragmented solid material 1, but still lower than that cracking temperature and lower than the temperature of formation of coke, dioxins and/or furans.

The cracking device 100 includes second means 132 for heating the flow of said cracking oil 2 to a temperature above said cracking temperature of at least one hydrocarbon compound of said fragmented hydrocarbon material 1 so that the mixture in the zone 128 of mixing by convergence of said hot cracking oil 2 and said cracking dispersion 6 reaches or exceeds said cracking temperature of at least one—in particular each—hydrocarbon compound of said cracking dispersion 6. The flow of said hot cracking oil 2 is free of any cracking catalyst 7, any hydrocarbon material 1 and any alkaline compound 8, so that heating it to a temperature above said cracking temperature of at least one hydrocarbon compound and, where applicable, to a temperature above the temperature of formation of coke, dioxins and/or furans is not accompanied by formation of coke, dioxins and/or furans. The flow of said cracking oil 2 is heated to a temperature above said cracking temperature of at least one hydrocarbon compound of the fragmented solid material 1 by the second heating means 132 based on a flow of said cracking oil 2 taken up at the outlet 133 of the cracking reactor 120.

Each flow of said cracking oil 2 in the first and second heating means 125, 132 is formed and controlled by means 134, 135 for pumping these flows of said cracking oil 2 and the temperature of each of these flows is adjusted depending on the intended use of each flow of said cracking oil 2.

For heating it to a temperature above said cracking temperature said cracking dispersion 6 is therefore not brought into contact with a heating surface of a conduction heating member the temperature of which is necessarily equal to or above the temperature of formation of coke, in particular greater than or equal to 360° C.—in particular above 400° C.—to be able to heat said cracking dispersion and so that it reaches a core temperature at least equal to said cracking temperature (which may be between 240° C. and 300° C. inclusive—in particular between 260° C. and 280° C.—depending on the fragmented solid material).

In all embodiments of a method according to the invention said cracking temperature is reached without bringing said cracking dispersion 6 into contact with a heating surface of a conduction heating member, said heating surface being necessarily heated to a temperature above the temperature of formation of coke, dioxins and/or furans and leading to the formation of coke, dioxins and/or furans.

The flow of said cracking dispersion 6 and the flow of said hot cracking oil 2 are mixed in the convergence zone 128 so that, because of this mixing in the mixing chamber 127, said cracking dispersion 6 reaches a temperature above said cracking temperature of at least one—in particular each—hydrocarbon compound of said cracking dispersion 6. By this means the cracking of at least one hydrocarbon compound is initiated in the mixing chamber 127.

The mixing chamber 127 is provided in its bottom part with a mixing turbine 153 that forms an ascending flow of said cracking dispersion 6 heated to said cracking temperature, this ascending flow being fed at the base from the mixing chamber 127 by the flow of said cracking dispersion 6 and by the flow of said hot cracking oil 2. The mixing turbine 153 is driven in rotation by a shaft and a motor 184. The ascending flow of said cracking dispersion 6 progresses in the mixing chamber 127 toward a so-called upper yield chamber 137 of the cracking reactor 120, forming a foam 9 in the process of expanding comprising a mixed solid/liquid composition and a gas phase formed of valorization products 10 resulting from the catalytic cracking dispersed in the mixed solid/liquid composition. The gas phase includes in particular short-chain hydrocarbons in the gas state, dihydrogen ($H_2$) gas generated by the catalytic cracking, carbon dioxide ($CO_2$) gas and water vapor. The initiation of the catalytic cracking reaction leads to dissociation of the catalyst or catalysts because of the cracking and liberation of the catalyst or catalysts instantaneously liable to be engaged in the continuation of cracking. The cracking reaction continues in said yield chamber 137. The flow of said cracking dispersion 6 in the finalization phase of the cracking, that is to say substantially free of fragmented solid material 1 and cracking catalyst 7 separated from said cracking oil 2 because of its higher mass per unit volume than said cracking oil 2, overflows into the top part of said yield chamber 137, forming an overflow lip 178. The flow of said cracking oil 2 recovered by overflow is collected at the outlet 133 of the cracking reactor 120 so that it can be recycled in a circuit 138 for recycling said cracking oil 2. The recycling circuit 138 includes a recycling column 160 provided with a pipe 161 for supplying the recycling circuit 138 with cracking oil 2 communicating with a supply reservoir. Likewise, the cracking catalyst or catalysts 7 is/are collected after settling out at the bottom 142 of the cracking reactor 120. The cracking catalyst or catalysts 7 can also be directed toward the mixing chamber 127 and/or toward the yield chamber 137 and/or toward the zone 128 of convergence of the flow of said cracking dispersion 6 and the flow of said hot cracking oil 2 by means deflectors 141, 143. Such redistribution of the catalyst or catalysts is made possible by a device 144 for radial stirring of said cracking dispersion 6 during cracking in the cracking reactor 120 enabling the time of contact of the reactive species in the mixing chamber 127 and in the yield chamber 137 to be increased. The radial stirring device 144 is driven in rotation by a motor 185.

As they appear in said cracking dispersion 6 heated to a temperature above said cracking temperature of at least one—in particular each—hydrocarbon compound the valorization products 10 in the gas state (hydrocarbon(s), carbon dioxide ($CO_2$), dihydrogen ($H_2$), water vapor) form with said cracking oil 2 of said cracking dispersion 6 an (oil/gas) foam 9 in the process of expanding because of the development of the cracking reaction.

In some embodiments the mixing chamber 127 and/or the yield chamber 137 may be provided with at least one ultrasound generator disposed so as to stimulate the catalytic cracking in the cracking dispersion 6 in the process of being cracked. The ultrasound generator enables the vibratory mechanical action of the ultrasound to achieve a homogeneous distribution of the reactive and catalytic species during cracking and optimization of the distribution of the fragmented solid material the catalyst and the alkaline compound in said cracking oil 2 by encouraging intermolecular impacts and the reactivity of these species present.

Any other complementary means for heating said cracking dispersion 6 in the mixing chamber 127 and/or in said yield chamber 137 is possible. In particular, such complementary heating means may be adapted to provide complementary heating of said cracking dispersion 6 to compensate the enthalpy of evaporation of the valorization products formed because of the catalytic cracking.

The cracking reactor 120 is provided with at least one dome 139 for collecting valorization products in the gas state formed because of the catalytic cracking. The dome 139 defines above the cracking reactor 120 a closed space 140 sealed against the gas fluids, containing a gas atmosphere 14 in contact with said cracking dispersion 6.

In a method according to the invention the gas atmosphere 14 in the dome 139 is maintained at a pressure below atmospheric pressure. This kind of reduced pressure maintained in particular in the dome 139 in contact with the foam 9 resulting from the catalytic cracking in progress enables reduction of the dissociation energy of the chemical species during cracking and lowering of said cracking temperature and therefore reduction of the energy input necessary for this dissociation, which reduction enables lowering of the temperature to a value below the coke formation temperature.

The gas atmosphere 14 in the dome 139 may be brought and maintained—in particular transiently—to a pressure below atmospheric pressure by means of a mechanical suction pump 115, or vacuum pump, communicating with the gas atmosphere the dome 139 for collecting the valorization products 10 in the gas state.

In some other particular embodiments the gas atmosphere 14 in the dome 139 can be maintained at a pressure below atmospheric pressure by a method including dynamic condensation of a flow of a second inert oil, known at condensation oil 12, from the expanded gas state to the condensed liquid state, this flow of said condensation oil 12 in the expanded gas state being created in said thermochemical vacuum pump 130 by evaporation/condensation of said condensation oil 12 by heating in a boiler 147 heated by standard heating means.

In these other particular embodiments said condensation oil 12 is an oil inert with respect to the catalytic cracking, that is to say an oil that undergoes no chemical modification when it is placed under temperature conditions appropriate to cracking and in contact with the valorization products in the gas state. It is chosen to be able to be evaporated at a temperature above the evaporation temperature of each valorization product 10 formed because of the cracking. Said condensation oil 12 is therefore chosen so that the valorization products 10 formed because of the cracking are in the gas state at the temperature of evaporation/condensation of said condensation oil 12 at the same cracking pressure.

In these other particular embodiments said thermochemical vacuum pump 130 includes a boiler 147 adapted to contain a quantity of said condensation oil 12 chosen to have an evaporation temperature above (but not much above) the catalytic cracking temperature. The boiler 147 is provided with means for heating said condensation oil 12 to a temperature above but close to the evaporation temperature of said condensation oil 12 at said cracking pressure and above the condensation temperature at that same pressure of the gas valorization products 10 formed because of the cracking. Said condensation oil 12 is a chemically stable thermal oil under the conditions of its use in a catalytic cracking method according to the invention. Said condensation oil 12 is chosen so as not to undergo degassing during its heating at reduced pressure and so as not to produce foam. For example said condensation oil 12 is a mineral oil having 26 carbon atoms the evaporation temperature of which at atmospheric pressure is of the order of 412° C. and the evaporation temperature of which at a pressure of 50 hPa is of the order of 290° C. and has a value close to said chosen cracking temperature.

In these other particular embodiments the boiler 147 is surmounted by a tubular member 146 for routing valorization products 10 formed in the cracking reactor 120 because of the cracking to a fractionated condensation device 131. The tubular member 146 includes:

- a so-called bottom condensation section 162 communicating at the bottom with the boiler 147, at the side with the atmosphere of the cracking reactor 120 and at the top with an intermediate so-called head loss section 149 of the tubular member 146. Said condensation section 162 is refrigerated in that it extends to the exterior in contact with atmospheric air at ambient temperature. Said condensation section 162 is adapted to initiate condensation of vapor of said condensation oil 12 rising from the boiler 147, to create a reduced pressure in said condensation section 162 because of that condensation and, in combination with the intermediate so-called head loss section 149, surmounted said condensation section 162, to maintain said condensation section 162 and the atmosphere of the cracking reactor 120 at reduced pressure, whereby a pressure difference is established between said condensation section 162 and a so-called thermal tapping section 163 at the top of the tubular member 146 extending above said head loss section 149;
- an intermediate so-called head loss section 149 provided with staggered refrigerating plates forming a high-density metal mesh 150 adapted to encourage exchanges of heat enabling continued cooling and condensation of the vapor of said condensation oil 12 in said head loss section 149 and reflux of the condensate formed in the direction of and into the boiler 147. The metal mesh 150 encourages exchanges of heat between the interior and the exterior of said head loss section 149 and continued cooling of said condensation oil 12 in the gas state leading to its condensation in contact with this metal mesh 150. The metal mesh 150 is made up of grills or screens carrying densely interleaved metal elements similar to compressed chips but allows the gas to rise in the tubular member 146 and the condensates to drop into the boiler 147. The metal mesh 150 creates a head loss because of the density of the metal elements. This head loss enables dynamic maintenance of the reduced pressure in said condensation section 162 and in said head loss section 149 in combination with the dynamic change of state of said condensation oil 12 from the expanded gas state to the condensed liquid state. Said condensation section 162 and said head loss section 149 in combination enable a reduced pressure to be maintained in said condensation section 162 and in the cracking reactor 120;
- an upper so-called thermal tapping section 163 extending from said head loss section 149 and adapted to drive the valorization gas products 10 toward to the fractionated condensation device 131.

The tubular member 146 is preferably of circular cylinder shape having in any cross-section a diameter sufficient to enable circulation of the valorization gas products 10 resulting from the cracking at a pressure below atmospheric pressure, in particular at most equal to 100 hPa—for example of the order of 300 mm—and a height chosen to enable said valorization gas products 10 to rise because of the effect of thermal tapping—for example of the order of 4000 mm.

Said condensation section 162 extends in front of a discharging extremity 148 of the dome 139 so that the reduced pressure formed in said condensation section 162 and in said head loss section 149 (because of the change of state and the condensation of said condensation oil 12 from the expanded gas state to the condensed liquid state) is propagated in the dome 139 the atmosphere of which is itself maintained at reduced pressure. A reduced pressure is therefore maintained in the atmosphere of the dome 139, of the cracking reactor 120 and of the tubular member 146 because of the gas/liquid condensation of said condensation oil 12 in contact with the metal mesh 150 and the associated head loss. The cracking reaction therefore proceeds in the cracking reactor 120 and in the yield chamber 137 at a so-called cracking pressure below atmospheric pressure and at a temperature at least equal to said cracking temperature of each hydrocarbon compound at said cracking pressure. Cracking occurs without formation of coke, dioxins and/or furans because of the reduced pressure, which reduces the energy necessary for the dissociation of the hydrocarbon compounds and the temperature of their decomposition, a quantity of energy that remains less than the quantity of energy necessary for the formation of coke, dioxins and/or furans.

In some embodiments said head loss section 149 is advantageously provided with an external sheath 158 for refrigeration of the vapor of said condensation oil 12 and condensation of that vapor. The refrigeration sheath 158 extends in front of said condensation section 162 and in front of the bottom part of said head loss section 149. The refrigeration sheath 158 may have passed through it a flow of a thermal energy heat exchange fluid encouraging the condensation of said condensation oil 12.

The dome 139 for collecting valorization products 10 in the gas state formed because of the catalytic cracking communicates via its discharge end 148 with said condensation section 162, whereby the vapor of the valorization products 10 in the gas state formed because of the cracking are mixed with said condensation oil 12 in the gas state from the boiler 147 and are driven by the latter into the tubular member 146. In said condensation section 162 and in said head loss section 149 only the vapor of said condensation oil 12 is liquefied when said condensation oil 12 is chosen to have a condensation temperature above the condensation temperature of the valorization products 10 formed because of the cracking and above said cracking temperature.

The inventor has determined that it is necessary to maintain the atmosphere of the cracking reactor 120 at a cracking pressure below atmospheric pressure, in particular at most equal to 100 hPa, for the volumetric flow of the condensed vapor of said condensation oil 12 to be at least equal to the flowrate of formation at the same pressure of valorization products 10 in the gas state formed because of the cracking. To this end it suffices to adjust the heating temperature of said condensation oil 12 in the boiler 147 so as to control the flowrate of formation of the vapor of the condensation oil 12 the condensation of which in said condensation section 162 and in said head loss section 149 is complete because of the capacity for evacuation of the heat energy via said head loss section 149. It has also been determined that the vapor of said condensation oil 12 formed in the boiler 147 at a temperature of the order of 290° C. for example, which is a temperature close to the temperature of the vapor of the valorization products (for example 280° C.) formed during cracking, are not significantly heated by mixing them with the valorization product vapor, so that the rapid cooling of the mixture in the tubular member 146 rapidly leads to the condensation of said condensation oil 12 in said condensation section 162 and in said head loss section 149, the condensate returning into the boiler 147 at a temperature very close to the evaporation temperature of said condensation oil 12, enabling evaporation at reduced pressure by a low input of energy.

There is nothing to prevent, during the condensation of said condensation oil 12 dropping toward the boiler 147, some or all of said condensation oil 12 to evaporate being in contact with the hot vapor of the valorization products 10 formed because of the cracking in the cracking reactor 120 and leads to an increase in the vacuum by condensation of said condensation oil 12 evaporated at constant heat in the boiler 147. It is then necessary to reduce the energy input to the boiler 147 by in return controlling the temperature in said head loss section 149.

The energy input to the boiler 147 may be of any kind. For example, energy may be input to the boiler 147 by combustion of some of the valorization products 10 formed because of the catalytic cracking. Any other source of energy is possible.

The tubular member 146 is provided in its top part 151 with a valve 152 for communication with a fractionated condensation device 131. Any type of fractionated condensation device 131 may be used. The fractionated condensation device 131 may be chosen to enable production of a mixture of alkanes with diverse hydrocarbon chain lengths by cooling and condensation of vapor of the valorization products 10 formed during cracking. The fractionated condensation device 131 may be chosen to enable fractionation, by means of an atmospheric pressure distillation column known in itself, and in which the gas oils and the kerosenes will be separated, the residual gases ($CO_2$, $H_2$) being collected after the separation of any presence of water. In some embodiments in which the production of dihydrogen ($H_2$) and of carbon dioxide ($CO_2$) is looked for, these uncondensed gases from the reaction may be separated by osmosis.

In a phase of starting up the catalytic cracking process carried out at a cracking pressure below atmospheric pressure, in particular at a cracking pressure at most equal to 100 hPa, said cracking oil 2 is heated to a temperature—in particular a temperature of the order of 280° C.—close to said cracking temperature of at least one hydrocarbon compound of the cracking dispersion 6 at said cracking pressure. In this start-up phase the cracking reactor 120 is free of any hydrocarbon compound and the cracking dispersion 6 is held in the conveyor 126 for loading said cracking dispersion 6 into the cracking reactor 120. No cracking occurs. In the boiler 147 said condensation oil 12 is maintained at a temperature just below its evaporation temperature. The mechanical suction pump 115 is then activated so as to place the atmosphere of the tubular member 146, of the yield chamber 137 of the cracking reactor 120 and of the boiler 147 at a reduced maximum vacuum pressure (so-called initiation pressure) of the order of or below 5 hPa. The mechanical suction pump 115 sucks in the gases present in this closed space and lowers the pressure of the gas atmosphere in the cracking reactor 120 and in said thermochemical vacuum pump 130. In some embodiments the mechanical suction pump 115 is stopped when the pressure reaches the required reduced pressure value of the order of 5 hPa, the reduced pressure being maintained.

In a phase subsequent to the start-up phase the heating temperature of the boiler 147 is raised to a temperature slightly above the evaporation temperature of said condensation oil 12 at this pressure below 5 hPa, whereby vapor of said condensation oil 12 is produced and rises by suction into the tubular member 146, whereby the pressure increases. The vapor of said condensation oil 12 being heated to a temperature slightly above the evaporation temperature thereof at reduced pressure, this vapor condenses in the bottom part of the tubular member 146 in said condensation section 162 and in said head loss section 149, maintaining at a reduced pressure the atmosphere of the dome 139, of the discharge extremity 148 of the dome 139 and of the tubular member 146. A permanent regime is established, maintaining the atmosphere of the cracking reactor at a pressure close to said cracking pressure. As soon as this equilibrium regime is achieved, a flow of said cracking dispersion 6 is introduced into the chamber 127 for mixing and initiation of the cracking reaction, whereby the reaction of cracking at least one hydrocarbon compound is initiated at a temperature close to 280° C. at a pressure of the order of 5 hPa. The vapor of the valorization products 10 formed because of the cracking is distributed into all the volumes at reduced pressure and mixed in the bottom part of the tubular member 146 with the vapor of said condensation oil 12. The pressure increases in the gas atmosphere in the cracking reactor 120 and in said thermochemical vacuum pump 130. Said condensation section 162 and said head loss section 149 behave like a dynamic thermochemical vacuum pump similar to a pump for maintaining the atmosphere at reduced pressure. As soon as the volume of the gas valorization products 10 in the cracking reactor 120 because of the catalytic cracking is compensated by the volume freed because of the condensation of said condensation oil 12 in said condensation section 162 and in said head loss section 149, a reduced pressure, in particular a pressure at most equal to 100 hPa, is maintained in the closed space 140 of the device. This reduced pressure in the cracking reactor 120 enables effective catalytic cracking at low temperature without formation of coke, dioxins and/or furans. This gas atmosphere 14 common to the cracking reactor 120 and said thermochemical vacuum pump 130 can be adjusted by the heat energy input to the boiler 147. For the same quantity of gas valorization products 10 formed because of the cracking, the variation of the volume of said condensation oil 12 in the gas state following condensation causes variation of the volume occupied by the gas valorization products 10 and the pressure in the gas atmosphere.

In the phase subsequent to the start-up phase, there is nothing to prevent adjusting the temperature in the drying/deoxygenation conveyor 104 to a temperature close to 180° C., the temperature in the conveyor 126 for loading said cracking dispersion 6 into the cracking reactor 120 at a temperature close to 240-250° C. and the temperature of said cracking oil 2 of the cracking reactor 120 to a temperature substantially equal to said cracking temperature of each hydrocarbon compound at a pressure of the order of 50 hPa. The duration of preheating to 180° C. of the drying/deoxygenation conveyor 104 may be of the order of 60 min to 90 min. The duration of preheating to 240-250° C. of the conveyor 126 for loading said cracking dispersion 6 into the cracking reactor 120 can be of the order of 30 min to 60 min and the duration of heating the bath of said cracking oil 2 filling the cracking reactor 120 of a volume of the order of 3000 L may be of the order of 15 min to 30 min. Immediately upon introduction into the cracking reactor of a flow of said cracking dispersion 6 and a flow of said cracking oil 2 heated to a temperature above said cracking temperature of each hydrocarbon compound of said cracking dispersion 6, so that the mixture is heated to a temperature above said cracking temperature of each hydrocarbon compound in said cracking dispersion 6 to said cracking pressure, catalytic cracking is initiated and valorization products 10 are formed.

In some embodiments the tubular member 146 is provided in its top part 151 with a peripheral inlet 154 for introducing valorization products 11 in the liquid state into the tubular member 146. This inlet 154 is intended to introduce a controlled flow of valorization products 11 in the liquid state into the tubular member 146, the evaporation of which in the tubular member 146 in contact with the hot vapor of the gas valorization products 10 reinforces the thermal tapping and the rise of the vapor of gas valorization products 10 formed because of the cracking.

The inventor has observed and experience has confirmed that the mass per unit volume of the valorization products 10 in the gas state formed because of the cracking, such as alkanes, carbon dioxide ($CO_2$), dihydrogen ($H_2$) and where applicable water ($H_2O$) is very much lower than the mass per unit volume of the vapor of said condensation oil 12. As soon as this vapor of low mass per unit volume has been drawn into a maximum vacuum zone 157, it can therefore no longer descend again in said thermochemical vacuum pump 130 and in a medium with a mean mass per unit volume higher than their own mass per unit volume, and which is furthermore rapidly ascending in the tubular member 146. Pushed toward the top of the tubular member 146, the vapor of the valorization products 10 formed in the gas state because of the cracking therefore progresses above the maximum vacuum zone 157 in the metal mesh 150.

The inventor has observed that it is possible to accentuate the upward movement of the vapor of the gas valorization products 10 and to entrain this vapor toward the top of the tubular member 146 by introducing a flow of liquid fuel 11 into the top part of the tubular member 146. This liquid fuel is evaporated when in contact with the hot vapor of the valorization products 10 progressing toward the top of the tubular member 146, the vapor of the fuel 11 formed by this heating necessarily being at a temperature below the temperature of the valorization products 10 progressing toward the top of the tubular member 146. The cold vapor of the fuel 11 formed at the periphery inside the tubular member 146 enables axial entrainment of the hot vapor of the valorization products by increased thermal tapping. The hot vapor of the valorization products 10 of lower mass per unit volume is entrained toward the top of the tubular member 146. The cold vapor of the fuel is heated as it progresses toward the bottom of the tubular member 146 and is then entrained toward the top by a descending flow of vapor of the fuel 11. A continuous movement is established. Experience has shown that, provided there is a sufficient height of said tapping section, the thermal tapping is sufficient with the injection of a proportion of the order of 15% to 20% of the net balance of the fuel produced and reintroduced at its distillation outlet temperature, for example at a temperature of the order of 130° C.

In some particular embodiments, after long-term functioning of the cracking device 100 is interrupted, inflammable vapor is liable to accumulate in the cracking device 100—in particular in the dome 139, in said thermochemical vacuum pump 130 and/or in the metal mesh 150 of the porous member. During the start-up phase it is necessary to open the degassing valves (not represented) during a step of preheating the cracking device 100. The degassing valves remaining open, the raising to temperature of the cracking device 100 is then initiated by activating the circuits for recycling said cracking oil 2 and the first and/or second means 125, 132 for heating said cracking oil 2. Said cracking oil 2 circulating in the cracking device 100 is heated to a temperature close to said cracking temperature.

In parallel with this said condensation oil 12 in said boiler 147 is heated to a temperature below but close to said cracking temperature. Following this preheating step the degassing valves are closed and the mechanical suction pump 115 is started so as to place the atmosphere of said cracking reactor 120 and of said thermochemical (gastight) vacuum pump 130 at said initiation pressure, below said cracking pressure but not low enough to be able to trigger the evaporation of said condensation oil 12 in the boiler 147. When the atmosphere is at said initiation pressure the heating of said condensation oil 12 is increased in said boiler 147 to initiate immediate evaporation of said condensation oil 12. The pressure increases because of this evaporation. A thermostat controls the boiler 147 to stabilize the temperature at the bottom of said condensation section 162 at the level of said cracking temperature. When the pressure reaches said cracking pressure in said condensation section 162 the vapor of said condensation oil 12 condenses. There is then established a permanent regime of evaporation/condensation at said cracking temperature and at said cracking pressure.

In the embodiment described here a flow of said cracking oil 2—in particular a recycled cracking oil 2—free of any hydrocarbon material 1, any cracking catalyst 7 and any alkaline compound 8 is preheated by the second heating means 132 to a temperature above said cracking temperature, for example between 310° C. and 320° C. inclusive, so that the mixture in the mixing zone 128 by mixing by convergence of said hot cracking oil 2 and said cracking dispersion 6 reaches and exceeds (in order to compensate losses and the evaporation enthalpy of the valorization products) said cracking temperature of at least one—in particular of each—hydrocarbon compound of said cracking dispersion 6 at said cracking pressure. Said cracking reaction is initiated and valorization products 10 in the gas state are formed because of this reaction. The pressure increases in the atmosphere of said cracking reactor 120 and of said thermochemical vacuum pump 130 which resumes functioning: the condensation flow of said condensation oil 12 increases and in the boiler 147 boiling decreases or stops: the pressure decreases and stabilizes at said cracking pressure. Conversely, when the pressure decreases in the atmosphere of said cracking reactor 120 and of said thermochemical vacuum pump 130 the condensation of said condensation oil 12 decreases and in the boiler 147 boiling is initiated or increases: the pressure increases and stabilizes at said cracking pressure.

A reduced pressure zone is formed at the center of said condensation section 162 because of said condensation oil 12 condensing and dropping into the boiler 147 and by upward expulsion of the gas valorization products 10 resulting from cracking that cannot descend again because of the effect of the dynamic pressure formed by the gas flow in the bottom part of said loss section 149.

EXAMPLE 1: CATALYTIC CRACKING OF SAWDUST

Sawdust is subjected to catalytic cracking at a pressure of 50 hPa to form a hydrocarbon with a mean composition including 13 atoms of carbon ($C_{13}H_{28}$) at 100 kg/h, dihydrogen ($H_2$) and carbon dioxide ($CO_2$). Catalytic cracking of a ton of sawdust lead to the formation of 679 kg of ($CO_2$), 306 kg of hydrocarbon tridecane ($C_{13}H_{28}$) and 15 kg of dihydrogen gas ($H_2$), respectively corresponding to the production of 1.4 mol/sec of carbon dioxide ($CO_2$), 0.15 mol/sec of tridecane ($C_{13}H_{28}$) and 0.69 mol/sec of dihydrogen gas ($H_2$). The volume of gas valorization products formed because of cracking is of the order of 2.2 mol/sec for an increase in the volume occupied by these gas valorization products of the order of 2.0 L/sec. To compensate this increase in the volume of the valorization productions 10 in the atmosphere of the cracking reactor and to maintain a pressure of 50 hPa, a mineral oil including 26 carbon atoms ($C_{26}$) and of molecular weight 366 is evaporated in the boiler so as to form 821 g/sec of mineral oil in the gas state the condensation of which compensates the formation of the gas valorization products 10.

Figure 3:
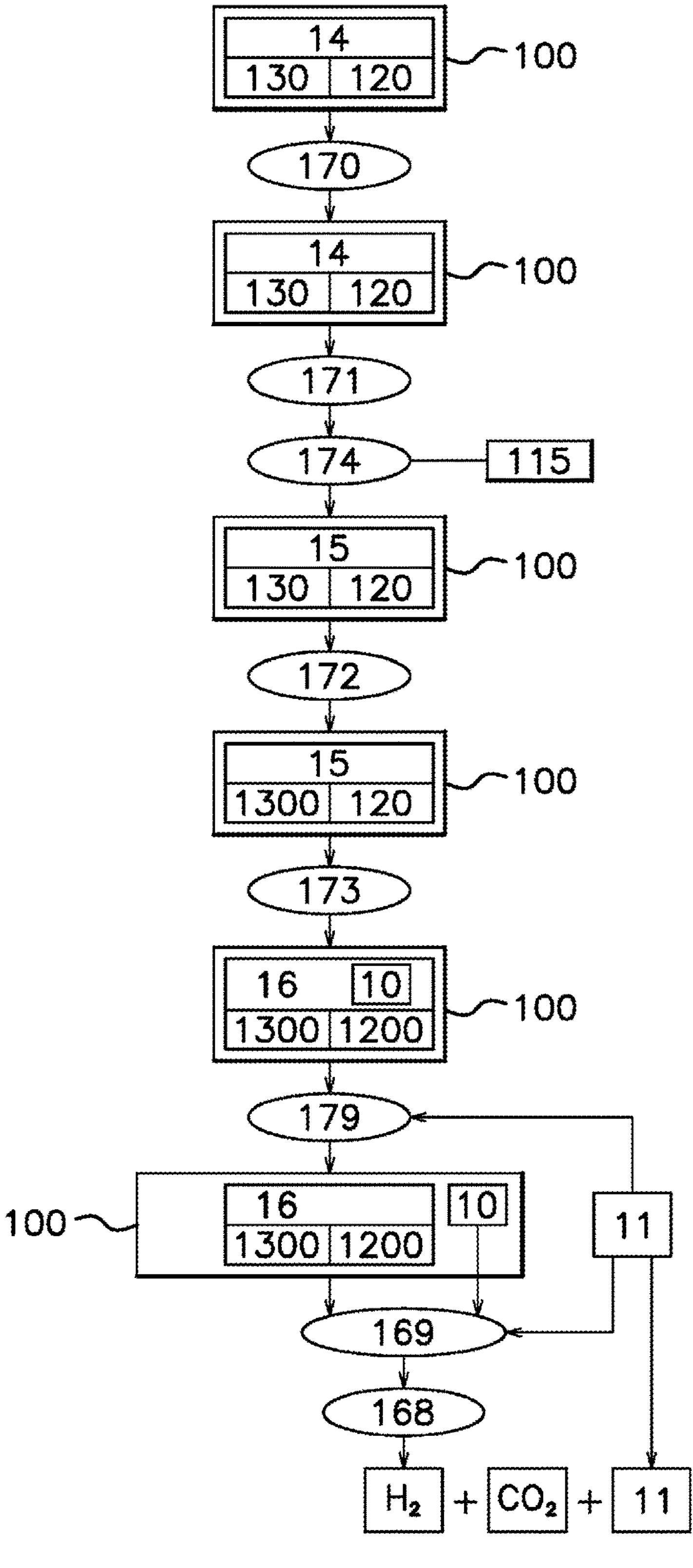
FIG. 3 is a block schematic of one particular embodiment of a catalytic cracking method according to the invention.

There is represented in FIG. 3 a block diagram of a method according to the invention of producing valorization products 10—in particular fuel 11, carbon dioxide ($CO_2$) and/or dihydrogen ($H_2$) gas—by the catalytic cracking at low temperature and at reduced pressure, that is to say at a pressure below atmospheric pressure, of a fragmented solid material 1—in particular waste—including at least one hydrocarbon compound 13.

A method according to the invention is executed in a cracking device 100 including a cracking reactor 120 and a thermochemical vacuum pump 130 forming a common gas atmosphere 14 at atmospheric pressure. In a method according to the invention, during a preparation phase 170 prior to initiation of catalytic cracking at reduced pressure, appropriate preheating is carried out in order for a flow of said cracking dispersion 6 and a flow of said cracking oil 2 to be introduced into the cracking reactor 120, each at an appropriate temperature to be able to reach said cracking temperature at the cracking pressure and to initiate catalytic cracking of at least one—in particular each—hydrocarbon compound during their introduction into the cracking reactor 120. To this end there are preheated in particular:

- said cracking dispersion 6 so that the flow of said cracking dispersion 6 reaches a temperature of the order of 245° C. in the conveyor 126 for loading said cracking dispersion 6 into the mixing and reaction initiation chamber 127,
- said cracking oil 2 so that the flow of said cracking oil 2 reaches a temperature of the order of 280° C. in the cracking reactor 120 and in the mixing and cracking reaction initiation chamber 127.

Of course there is nothing to prevent preheating of all of the compounds, reagents, catalysts and dispersions of the fragmented solid material 1 in said cracking oil 2 used in said unit 110 for preparation of said cracking dispersion 6 before it is cracked in the cracking reactor 120. There is nothing to prevent heating the flow of said cracking oil 2 so that it reaches a temperature of the order of 180° C. in the heating sheath 108 of the drying/deoxygenation conveyor 104. There is nothing to prevent preheating the hydrocarbon dispersion 3 and/or the dried dispersion 4 and/or the degassed dispersion 5 and said cracking oil 2 to a temperature as close as possible to its optimum temperature of use. This preheating is effected by any appropriate means to enable preparation of each compound at a temperature as close as possible to its temperature of use.

In the embodiment of the method represented in FIG. 3 when the aforementioned temperatures are reached and said cracking dispersion 6 is ready to be introduced into the cracking reactor 120 a step 171 is initiated of heating said condensation oil 12 in the boiler 147 of said thermochemical vacuum pump 130. By this heating 171 of said condensation oil 12 said condensation oil 12 is heated to a temperature as close as possible to but still below the evaporation temperature of said condensation oil 12 at the aforementioned pressure of the order of 5 hPa. Said condensation oil 12 remains in the condensed liquid state in the boiler 147 being preheated and the gas atmosphere 14 of which is at atmospheric pressure.

In an embodiment of the method represented in FIG. 3 when the aforementioned temperatures are reached said cracking dispersion 6 is ready to be introduced into the cracking reactor 120 and said condensation oil is preheated to a temperature below its evaporation temperature at 5 hPa the common atmosphere 14 in the dome 139 of the cracking reactor 120 and in said thermochemical vacuum pump 130 is pumped 174 by means of the mechanical suction pump 115. Because of this pumping 174 the atmosphere 15 common to the dome 139, the cracking reactor 120 and said thermochemical vacuum pump 130 is reduced in pressure, for example to a pressure of the order of 5 hPa, whereby the gases present in the common atmosphere 15 at reduced pressure are evacuated. Because the temperature of said condensation oil 12 is below the evaporation temperature of said condensation oil 12 at 5 hPa said condensation oil 12 is in the condensed liquid state in the boiler 147.

In the embodiment of the method represented in FIG. 3 said condensation oil 12 is heated in the boiler 147 of said thermochemical vacuum pump 130 to a temperature above the evaporation temperature of said condensation oil 12 at a pressure of 5 hPa so that said condensation oil 12 goes to the expanded gas state, circulates in said thermochemical vacuum pump 130 and is condensed at least in part in said condensation section 162 and/or in contact with said head loss section 149. Because of this condensation 172 in said condensation section 162 and contact with the metal mesh 150 (where appropriate amplified by circulation of a heat-exchange fluid in the refrigeration sheath 158) in said head loss section 149, the common gas atmosphere 15 of the dome 139, the cracking reactor 120 and said thermochemical vacuum pump 130 is maintained at a reduced pressure of the order of 5 hPa.

In the embodiment of the method represented in FIG. 3 a phase 173 of initiation of cracking is carried out by introduction of said cracking dispersion 6 into the cracking reactor 120 and by mixing with and contact with said heated cracking oil 2 so that the mixture reaches said cracking temperature of at least one hydrocarbon compound in the cracking reactor 120. Such heating can, for example, be achieved by adding a flow of said cracking oil 2 heated to a temperature above said cracking temperature of each hydrocarbon compound in said cracking dispersion 6. This mixture—in particular in the convergence zone 128 in the mixing chamber 127 of the cracking reactor 120—of the flow of said preheated cracking dispersion 6 and of the flow of said cracking oil 2 heated to a temperature above said cracking temperature of each hydrocarbon compound is carried out so that said cracking temperature of each hydrocarbon compound is achieved because of this mixing. Valorization products 10 in the gas state are formed because of the catalytic cracking and are released into the gas atmosphere 15 of the cracking reactor 100 in which the pressure increases.

The increased pressure of the gas atmosphere 16—because of the formation of the gas valorization products 10—to a value between 30 hPa and 50 hPa inclusive is compensated by the condensation of said condensation oil 12 in said thermochemical vacuum pump 130, by heating said condensation oil 12 to a temperature just above the evaporation temperature of said condensation oil 12 at the pressure of the gas atmosphere 16. Said cracking pressure is reached and maintained because of the adjustment of the heating and of the evaporation of said condensation oil 12. A permanent partial reduced pressure—in particular at a value at most equal to 50 hPa—is established by the heating, evaporation and condensation of said condensation oil 12 in said thermochemical vacuum pump 130. A permanent partial reduced pressure of this kind is maintained as soon as the volumetric condensation flow of said condensation oil 12 equal in absolute value to this pressure of 50 hPa, the volumetric flow of production of gas valorization products 10 formed because of the catalytic cracking. The volumetric condensation flow of said condensation oil 12 is advantageously controlled by adjusting the evaporation flow of said condensation oil 12 and by the thermal energy obtained for this evaporation by the boiler 147.

In the embodiment of the method represented in FIG. 3 the gas valorization products 10 formed at said cracking pressure—in particular at most equal to 100 hPa—because of the catalytic cracking rise in the dome 139 of the catalytic reactor 120 and in said head loss section 149 of said thermochemical vacuum pump 130, in which the temperature is too high to enable condensation thereof, as soon as the vapor of said condensation oil 12 is at a temperature at least equal to the evaporation temperature of said condensation oil 12 at the cracking pressure (at most equal to 60 hPa), which is in turn above the evaporation temperature of each of the valorization products 10 produced because of the cracking. The hot vapor of the valorization products 10 reach said head loss section 149 by rising in the tubular member 146. The hot vapor of said condensation oil 12 has a mass per unit volume greater than the mass per unit volume of the hot vapor of the valorization products 10 at the same temperature and so the valorization products 10 in the gas state are prevented from descending in said thermochemical vacuum pump 130 and accumulate in the metal mesh 150 before the upper part of this accumulation is in entrained toward the top of the tubular member 146 by thermal tapping.

This is all the more so when, in the embodiment of the method represented in FIG. 3, thermal tapping 179 is induced by adding in the upper part 154 of the tubular member 146 a flow of fuel 11 in the liquid state. The fuel 11 of this flow of fuel—the temperature of which is necessarily lower than the temperature of the gas valorization products 10 progressing in the direction of the upper part 154 of the tubular member 146—is evaporated by and in contact with the vapor of these ascending valorization products 10 the temperature of which, in the absence of any forced cooling, is maintained at a value of the order of 240° C. Because of the temperature difference between the flow of evaporated fuel and the flow of valorization products the mass per unit volume of the evaporated fuel is necessarily greater than the mass per unit volume of the gas valorization products 10, the thermal tapping 179 is established in the tubular member 146, which is of great length. Because of the mass per unit volume difference and the temperature difference of the two gases, the thermal tapping 179 conditions are combined and the valorization products 10 progress in the tubular member 146 and reach the fractionated condensation device 131.

In the embodiment of the method represented in FIG. 3 the upper end 145 of the tubular member 146 communicating with the lower part of a device, in particular of a fractionated condensation column 131, there follows a step 169 of fractionated condensation—in particular a fractionated distillation step-enabling separation of the condensates (kerosene, gas oil, etc.) according to their evaporation/condensation temperature. Following distillation, at a temperature of the order of 130° C. and at atmospheric pressure, the residual gas flow resulting from condensation of the kerosene is cooled to a temperature below 100° C. in a water condensation column. The condensed water is collected in the liquid form at the bottom of the column from which it is extracted by gravity by means of a siphon.

In the embodiment of the method represented in FIG. 3 the carbon dioxide ($CO_2$) and the dihydrogen gas ($H_2$) are separated by osmosis 168.

The invention can lend itself to numerous variants and applications other than those described hereinabove. In particular, it goes without saying that unless otherwise indicated the various structural and functional characteristics of each of the embodiments described hereinabove must not be considered as combined and/or narrowly and/or inextricably bound to one another, but to the contrary as mere juxtapositions. Furthermore, the structural and/or functional characteristics of the various embodiments described hereinabove may be the subject of some or all of any different juxtaposition or any different combination. For example, the dimensions, the organization in space and the design of the various constituent elements of the cracking device are open to infinite variants.

The invention claimed is:

1. A method for producing at least one valorization product, chosen in the group formed of short-chain fuel alkanes, alkenes, dihydrogen gas and carbon dioxide, by catalytically cracking at a low temperature a fragmented solid material without the formation of coke, dioxins and/or furans, Said method comprising the step of bringing to a temperature, referred to as the cracking temperature, a cracking dispersion composition having:

a first oil, referred to a cracking oil, which is inert against the catalytic cracking, a fragmented solid material including at least one hydrocarbon compound, at least one catalytic cracking catalyst, and at least one alkaline compound, said cracking temperature, of between 250° C. and 300° C. inclusive, chosen so as to enable at least one gas valorization product to be produced by catalytically cracking at least one hydrocarbon compound of the fragmented solid material in said cracking dispersion; and the flow of said cracking dispersion at said cracking temperature is placed in a gastight cracking reactor and in contact with a gas atmosphere at a pressure, referred to as the cracking pressure, that is below atmospheric pressure;

wherein the gas atmosphere is maintained at said cracking pressure through gas exchange communication between the gas atmosphere of said cracking reactor and the gas atmosphere of a device, referred to as a thermochemical vacuum pump, that generates a reduced pressure formed, by way of a change of state, from an expanded gas state to a condensed liquid state, a second inert oil, referred to as a condensation oil, which is refluxed at a temperature above the evaporation temperature of said condensation oil at said cracking pressure in said thermochemical vacuum pump, the change of state of said condensation oil from the expanded gas state to the condensed liquid state is brought about in said thermochemical vacuum pump in gas exchange communication with the gas atmosphere of said cracking reactor, the condensation oil being chosen so that its state-change temperature is at the level of said cracking temperature at said cracking pressure.

2. The method as claimed in claim 1, wherein said cracking pressure is at most equal to 100 hPa.

3. The method as claimed in claim 1, wherein the change of state of said condensation oil from the expanded gas state to the condensed liquid state is initiated in a lower condensation section of a tubular member of said thermochemical vacuum pump, the tubular member enabling routing of the valorization products formed in the cracking reactor because of the cracking to a fractionated condensation device, said condensation section being in gas fluid communication with the gas atmosphere of the cracking reactor, said condensation section being adapted to be able to receive the flow of said condensation oil in the gas state, to lower the temperature of said condensation oil in the gas state to a temperature below the condensation temperature of said condensation oil at said cracking pressure, to enable condensation of the flow of said condensation oil from the expanded gas state to the condensed liquid state, and to generate the reduced pressure because of this condensation.

4. The method as claimed in claim 1, wherein the change of state of said condensation oil from the expanded gas state to the condensed liquid state continues in an intermediate lower head loss section of the tubular member surmounting said condensation section and including a porous member including a metal mesh adapted:

to enable exchange of heat with said condensation oil and a change of state of said condensation oil from the expanded gas state to the condensed liquid state, and to maintain because of a head loss a pressure difference between said condensation section and the upper part of the tubular member.

5. The method as claimed in claim 1, wherein during catalytic cracking said condensation oil is heated to a temperature hardly above the evaporation temperature of said condensation oil at said cracking pressure in a container termed a boiler of a heating member forming a lower part of said thermochemical vacuum pump.

6. The method as claimed in claim 5, wherein during a preparatory step of the catalytic cracking:

a bath of said cracking oil is heated to said cracking temperature in the cracking reactor, the gas atmosphere common to the cracking reactor and said thermochemical pump is brought to a initiation pressure below said cracking pressure by pumping that gas atmosphere by means of a mechanical suction pump, a bath of said condensation oil is preheated in said boiler to a temperature below and close to the evaporation temperature of said condensation oil at said initiation pressure, then the mechanical pumping of the gas atmosphere of the cracking reactor and of said thermochemical vacuum pump at said initiation pressure is interrupted, then said condensation oil is heated in said boiler to a temperature above but close to the evaporation temperature of said condensation oil at said cracking pressure, whereby vapor of said condensation oil rises in said condensation section and condenses in contact with said condensation section and in said head loss section, whereby, the temperature being constant, there is established a continuous regime of evaporation/condensation maintaining the gas atmosphere of the cracking reactor at the level of said cracking pressure because of the continuity of the temperature at the level of said cracking temperature, and in that during a step of initiation of the catalytic cracking a flow of said cracking dispersion and a flow of hot recycled cracking oil are introduced into the reactor and mixed at a common point of the cracking reactor so that said cracking dispersion is heated to and maintained at said cracking temperature at said cracking pressure, whereby valorization products in the gas state are formed in the gas atmosphere at said cracking pressure.

7. The method as claimed in claim 1, wherein the valorization products in the gas state produced because of the catalytic cracking are driven into an upper thermal tapping section of the tubular member and then a fractionated condensation device because of the effect of thermal tapping induced by introduction into the upper part of said thermochemical vacuum pump of a flow of the fuel in the liquid state, the fuel in the liquid state evaporating as it descends said thermal tapping section in the direction of said head loss section, the fuel evaporated in this way being at a temperature below the temperature of the valorization products in the gas state produced because of the cracking, the flow of evaporated fuel enabling ascension by thermal tapping of the flow of valorization products in the gas state to the fractionated condensation device.

8. The method as claimed in claim 7, wherein the flow of evaporated fuel is heated in contact with the valorization products in the gas state produced because of the catalytic cracking and recycled in said thermochemical vacuum pump and the fractionated condensation device.

9. The method as claimed in claim 1, wherein said cracking dispersion is heated in the cracking reactor by mixing a flow of said cracking dispersion and a flow of said cracking oil previously heated to a temperature above said cracking temperature of each hydrocarbon compound of the solid material at said cracking pressure, the mixing being carried out so that said cracking dispersion reaches said cracking temperature without formation of coke, dioxins and/or furans.

10. The method as claimed in claim 1, wherein said cracking dispersion is subjected to a treatment by ultrasound during the catalytic cracking.

11. The method as claimed in claim 1, wherein there is carried out condensation of at least one valorization product in the gas state formed because of the catalytic cracking under conditions suitable for forming a fuel in the liquid state.

12. The method as claimed in claim 11, wherein carbon dioxide is extracted from the residual gas products of said condensation by osmosis.

13. A device for catalytic cracking at low temperature of a fragmented solid material without formation of coke, dioxins and/or furans, the device including a gastight cracking reactor adapted to heat a flow of a cracking dispersion composition, including a first oil, referred to a cracking oil, which is inert against the catalytic cracking, a fragmented solid material including at least one hydrocarbon compound, at least one catalytic cracking catalyst, and at least one alkaline compound, at a cracking temperature between 250° C. and 300° C. inclusive and chosen to enable production of at least one valorization product in the gas state by the catalytic cracking of at least one hydrocarbon compound of the fragmented solid material in said cracking dispersion, and to maintain said cracking dispersion in contact with a gas atmosphere in the cracking reactor, the cracking device comprising: means adapted to maintain the gas atmosphere at a so called cracking pressure below atmospheric pressure, wherein said cracking device further comprises a thermochemical vacuum pump device in gas exchange communication with the gas atmosphere of said cracking reactor, said thermochemical vacuum pump being adapted to enable a change of state of a second inert, condensation oil from the expanded gas state to the condensed liquid state, said condensation oil being heated to a temperature above the evaporation temperature of said condensation oil at said cracking pressure, and to maintain the gas atmosphere of the cracking reactor at said cracking pressure because of a reduced pressure created because of this change of state, said condensation oil being chosen so that its change of state temperature is at the level of said cracking temperature at said cracking pressure.

14. The device as claimed in claim 13, wherein said thermochemical vacuum pump includes:

a boiler member for heating said condensation oil adapted to heat said condensation oil to said evaporation temperature and discharging into a tubular member for routing valorization products in the gas state formed in the cracking reactor because of the cracking to a fractionated condensation device, the tubular member surmounting the heating member and discharging into the heating member and forming:

a lower condensation section in gas-fluid communication with the gas atmosphere of the cracking reactor and adapted to be able to receive the flow of said condensation oil in the gas state to lower its temperature to a temperature below the evaporation temperature of said condensation oil at said cracking pressure and to enable condensation of the flow of said condensation oil from the expanded gas state to the condensed liquid state and to maintain the pressure of the gas atmosphere of the cracking reactor at said cracking pressure, an intermediate head loss section surmounting said condensation section provided with a porous member including a metal mesh adapted to complete the change of state of said condensation oil from the expanded gas state to the condensed liquid state, said condensation section being in gas exchange communication with said head loss section and with the common gas atmosphere of the cracking reactor and said thermochemical vacuum pump.

15. The device as claimed in claim 13, wherein the fractionated condensation device is a device for distillation/condensation of at least one valorization product in the gas state and its conversion into liquid fuel.

16. The device as claimed in claim 15, wherein the tubular member forms an upper thermal tapping section extending downward from said head loss section and adapted to drive the valorization products in the gas state toward the fractionated condensation device, said thermal tapping section being provided in its upper part with an inlet for a flow of valorization products in the liquid state in said thermal tapping section enabling rising of the valorization products in the gas state by reinforcing the thermal tapping in the tubular member and the introduction of these valorization products into the fractionated condensation device.

* * * * *